United States Patent
Babbellapati et al.

(10) Patent No.: US 12,501,343 B2
(45) Date of Patent: Dec. 16, 2025

(54) MULTICAST TRAFFIC SCHEDULING ACROSS MULTIPLE RADIO ACCESS TECHNOLOGIES

(71) Applicant: QUALCOMM Incorporated, San Diego, CA (US)

(72) Inventors: Syam Krishna Babbellapati, Chennai (IN); Sitaramanjaneyulu Kanamarlapudi, San Diego, CA (US); Prasad Reddy Kadiri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 603 days.

(21) Appl. No.: 17/942,973

(22) Filed: Sep. 12, 2022

(65) Prior Publication Data
US 2024/0089826 A1  Mar. 14, 2024

(51) Int. Cl.
*H04W 48/02* (2009.01)
*H04B 7/0452* (2017.01)
*H04L 5/00* (2006.01)
*H04W 84/12* (2009.01)

(52) U.S. Cl.
CPC .......... *H04W 48/02* (2013.01); *H04B 7/0452* (2013.01); *H04L 5/0053* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2018/0054717 A1 | 2/2018 | Navalekar et al. | |
| 2018/0083793 A1* | 3/2018 | Kim | H04L 45/16 |
| 2018/0176887 A1 | 6/2018 | Strobl | |
| 2018/0288659 A1 | 10/2018 | Jamadagni et al. | |
| 2020/0205174 A1* | 6/2020 | Prasad | H04W 4/06 |
| 2021/0127343 A1* | 4/2021 | Mladin | H04W 76/14 |

(Continued)

FOREIGN PATENT DOCUMENTS

| | | | |
|---|---|---|---|
| WO | WO-2023170584 A1 * | 9/2023 | |
| WO | WO-2024025867 A1 * | 2/2024 | H04W 4/06 |

OTHER PUBLICATIONS

International Search Report and Written Opinion—PCT/US2023/073322—ISA/EPO—Nov. 22, 2023 (2202423WO).

*Primary Examiner* — Saumit Shah
(74) *Attorney, Agent, or Firm* — Holland & Hart LLP

(57) ABSTRACT

Methods, systems, and devices for wireless communications are described that provide for multicast communications that originate at a wide area network (WAN) using a first RAT to be provided to a local area network (LAN) that uses a second RAT that is used to complete the multicast communications to a user equipment (UE). A scheduler of the second RAT may use one or more parameters associated with the multicast communications to prioritize transmission of the multicast data to one or more UEs. The scheduler of the second RAT may prioritize the multicast communications with other communications of the second RAT based on one or more of a number of clients served, a quality of service (QoS) or bandwidth of the multicast communications, a capability of the UEs, one or more other data flows, a feedback scheme associated with the multicast communications, or any combinations thereof.

26 Claims, 18 Drawing Sheets

(56) References Cited

U.S. PATENT DOCUMENTS

| | | |
|---|---|---|
| 2021/0136631 A1 | 5/2021 | Lee et al. |
| 2021/0266753 A1* | 8/2021 | Kumar .............. H04W 28/0252 |
| 2022/0279389 A1* | 9/2022 | Xing ................ H04W 28/0226 |
| 2023/0006889 A1* | 1/2023 | Thyagaturu ......... H04L 41/5054 |
| 2024/0223339 A1* | 7/2024 | Wang ..................... H04L 61/50 |

* cited by examiner

MULTICAST TRAFFIC SCHEDULING ACROSS MULTIPLE RADIO ACCESS TECHNOLOGIES

FIELD OF TECHNOLOGY

The following relates to wireless communications, including multicast traffic scheduling across multiple radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some deployments, a UE may be capable of radio communications using two or more radio access technologies (RATs). For example, a UE may be capable of wireless communications using wide area network (WAN) such as 4G or 5G wireless communications systems, and also a wireless local area network (WLAN) such as a Wi-Fi (i.e., Institute of Electrical and Electronics Engineers (IEEE) 802.11) network. In some cases, a communication may be transmitted using multiple networks, such as a communication that originates at a WAN and is competed using a WLAN. Efficient techniques for communications across multiple RATs may help to improve throughput, reliability, and user experience.

SUMMARY

The described techniques relate to improved methods, systems, devices, and apparatuses that support multicast traffic scheduling across multiple radio access technologies (RATs). In various aspects, described techniques provide for multicast communications that originate at a wide area network using a first RAT, such as a fifth generation (5G) wireless communications network, to be provided to a local area network that uses a second RAT, such as a Wi-Fi network, that is used to complete the multicast communications to one user equipment (UE) or multiple UEs. In some aspects, a device that receives the multicast communications, such as a customer premises equipment (CPE), via the first RAT may decode multicast data from the multicast communications and provide the multicast data to a scheduler of the second RAT along with one or more parameters associated with the multicast data.

The scheduler of the second RAT may use the one or more parameters to prioritize transmission of the multicast data to the one or more UEs. In some cases, the scheduler of the second RAT may prioritize the multicast communications with other communications of the second RAT based on one or more of a number of clients that are to receive the multicast communications, a quality of service (QoS) associated with the multicast communications, a bandwidth of the multicast communications, a capability of the clients that use the second RAT for multiple access, one or more other data flows that are provided using the second RAT, a feedback scheme associated with the multicast communications, or any combinations thereof.

A method for wireless communication is described. The method may include receiving multicast data associated with a multicast service via a first wireless network using a first radio access technology, where the multicast data is to be provided to one or more clients via a second wireless network using a second radio access technology, and where the multicast service has a set of multicast service parameters, transmitting, to a scheduler of the second wireless network, an information message that indicates one or more multicast service parameters of the set of multicast service parameters, and transmitting the multicast data to the scheduler for transmission via the second wireless network.

An apparatus for wireless communication is described. The apparatus may include a processor, memory coupled with the processor, and instructions stored in the memory. The instructions may be executable by the processor to cause the apparatus to receive multicast data associated with a multicast service via a first wireless network using a first radio access technology, where the multicast data is to be provided to one or more clients via a second wireless network using a second radio access technology, and where the multicast service has a set of multicast service parameters, transmit, to a scheduler of the second wireless network, an information message that indicates one or more multicast service parameters of the set of multicast service parameters, and transmit the multicast data to the scheduler for transmission via the second wireless network.

Another apparatus for wireless communication is described. The apparatus may include means for receiving multicast data associated with a multicast service via a first wireless network using a first radio access technology, where the multicast data is to be provided to one or more clients via a second wireless network using a second radio access technology, and where the multicast service has a set of multicast service parameters, means for transmitting, to a scheduler of the second wireless network, an information message that indicates one or more multicast service parameters of the set of multicast service parameters, and means for transmitting the multicast data to the scheduler for transmission via the second wireless network.

A non-transitory computer-readable medium storing code for wireless communication is described. The code may include instructions executable by a processor to receive multicast data associated with a multicast service via a first wireless network using a first radio access technology, where the multicast data is to be provided to one or more clients via a second wireless network using a second radio access technology, and where the multicast service has a set of multicast service parameters, transmit, to a scheduler of the second wireless network, an information message that indicates one or more multicast service parameters of the set of multicast service parameters, and transmit the multicast data to the scheduler for transmission via the second wireless network.

Some examples of the method, apparatuses, and non-transitory computer-readable medium described herein may further include operations, features, means, or instructions for receiving, from the scheduler, an indication to admit the multicast service or reject the multicast service, and where the transmitting the multicast data may be performed responsive to the indication to admit the multicast service. In some examples of the method, apparatuses, and non-transitory computer-readable medium described herein, the set of multicast service parameters include one or more of a quantity of clients associated with the multicast service, one or more quality of service parameters, a data rate target of the multicast data, a quantity of non-multicast data flows to be communicated concurrently with the multicast service, or a feedback scheme associated with the multicast service. In some examples of the method, apparatuses, and non-transitory computer-readable medium described herein, the quantity of clients indicates a quantity of endpoint devices that are to be supported using the multicast service.

In some examples of the method, apparatuses, and non-transitory computer-readable medium described herein, the one or more quality of service parameters indicate an amount of delay tolerance of the multicast data. In some examples of the method, apparatuses, and non-transitory computer-readable medium described herein, the feedback scheme associated with the multicast service indicates a no-feedback scheme, a negative-acknowledgment-only feedback scheme, or an acknowledgment/negative-acknowledgment feedback scheme. In some examples of the method, apparatuses, and non-transitory computer-readable medium described herein, the first wireless network may be a fifth generation (5G) or sixth generation (6G) radio access network and the second wireless network may be a wireless local area network (WLAN).

A method for wireless communication is described. The method may include receiving, from a wireless modem, an information message that indicates one or more multicast service parameters associated with a multicast service that is provided via the wireless modem using a first wireless network that uses a first radio access technology, receiving, from the wireless modem, at least a first multicast data communication, where the first multicast data communication is to be transmitted to one or more clients via a second wireless network using a second radio access technology, and transmitting the first multicast data communication to at least a first client via the second wireless network based on a prioritization of the first multicast data communication relative to one or more other data communications that are to be transmitted via the second wireless network, where the prioritization is based on the one or more multicast service parameters.

An apparatus for wireless communication is described. The apparatus may include a processor, memory coupled with the processor, and instructions stored in the memory. The instructions may be executable by the processor to cause the apparatus to receive, from a wireless modem, an information message that indicates one or more multicast service parameters associated with a multicast service that is provided via the wireless modem using a first wireless network that uses a first radio access technology, receive, from the wireless modem, at least a first multicast data communication, where the first multicast data communication is to be transmitted to one or more clients via a second wireless network using a second radio access technology, and transmit the first multicast data communication to at least a first client via the second wireless network based on a prioritization of the first multicast data communication relative to one or more other data communications that are to be transmitted via the second wireless network, where the prioritization is based on the one or more multicast service parameters.

Another apparatus for wireless communication is described. The apparatus may include means for receiving, from a wireless modem, an information message that indicates one or more multicast service parameters associated with a multicast service that is provided via the wireless modem using a first wireless network that uses a first radio access technology, means for receiving, from the wireless modem, at least a first multicast data communication, where the first multicast data communication is to be transmitted to one or more clients via a second wireless network using a second radio access technology, and means for transmitting the first multicast data communication to at least a first client via the second wireless network based on a prioritization of the first multicast data communication relative to one or more other data communications that are to be transmitted via the second wireless network, where the prioritization is based on the one or more multicast service parameters.

A non-transitory computer-readable medium storing code for wireless communication is described. The code may include instructions executable by a processor to receive, from a wireless modem, an information message that indicates one or more multicast service parameters associated with a multicast service that is provided via the wireless modem using a first wireless network that uses a first radio access technology, receive, from the wireless modem, at least a first multicast data communication, where the first multicast data communication is to be transmitted to one or more clients via a second wireless network using a second radio access technology, and transmit the first multicast data communication to at least a first client via the second wireless network based on a prioritization of the first multicast data communication relative to one or more other data communications that are to be transmitted via the second wireless network, where the prioritization is based on the one or more multicast service parameters.

Some examples of the method, apparatuses, and non-transitory computer-readable medium described herein may further include operations, features, means, or instructions for determining, based on the one or more multicast service parameters, to admit or reject the multicast service. In some examples of the method, apparatuses, and non-transitory computer-readable medium described herein, the one or more multicast service parameters include one or more of a quantity of clients associated with the multicast service, one or more quality of service parameters associated with the multicast service, a data rate target of the multicast service, a quantity of non-multicast data flows to be communicated concurrently with the multicast service, a capability of each of the clients associated with the multicast service, or a feedback scheme associated with the multicast service.

Some examples of the method, apparatuses, and non-transitory computer-readable medium described herein may further include operations, features, means, or instructions for determining, based on the capability of each of the clients associated with the multicast service, to admit or reject the multicast service. In some examples of the method, apparatuses, and non-transitory computer-readable medium described herein, the capability of each of the clients includes an orthogonal frequency division multiple access (OFDMA) capability or a multi-user multiple-input-multiple-output (MU-MIMO) capability.

Some examples of the method, apparatuses, and non-transitory computer-readable medium described herein may further include operations, features, means, or instructions for mapping data communications associated with the multicast service to a separate access category (AC) queue of the second wireless network and scheduling data transmissions from the separate AC queue to the one or more clients based on a higher priority of the separate AC queue than one or more other AC queues. In some examples of the method, apparatuses, and non-transitory computer-readable medium described herein, the mapping the data communications associated with the multicast service to the separate AC queue may be based on one or more quality of service (QoS) threshold values associated with the separate AC queue and the one or more other AC queues, and a QoS associated with the multicast service that indicates an amount of delay tolerance of the multicast service. In some examples of the method, apparatuses, and non-transitory computer-readable medium described herein, the mapping the data communications associated with the multicast service to the separate AC queue may be based on a feedback scheme of the multicast service, and where a no-feedback scheme or a negative-acknowledgment feedback scheme may be mapped to a lower priority AC queue and an acknowledgment/negative-acknowledgment feedback scheme may be mapped to the separate AC queue that has higher priority than the one or more other AC queues.

Some examples of the method, apparatuses, and non-transitory computer-readable medium described herein may further include operations, features, means, or instructions for determining, based on a quantity of the one or more clients that are to receive the multicast service, to admit or reject the multicast service. Some examples of the method, apparatuses, and non-transitory computer-readable medium described herein may further include operations, features, means, or instructions for scheduling data transmissions associated with the multicast service using OFDMA or MU-MIMO based on an associated capability of each of the one or more clients and a data rate associated with the multicast service being above a data rate threshold value. In some examples of the method, apparatuses, and non-transitory computer-readable medium described herein, one or more threshold values associated with the one or more multicast service parameters may be adjusted based on a quantity of other multicast service flows and other non-multicast service flows. In some examples of the method, apparatuses, and non-transitory computer-readable medium described herein, the first wireless network may be a 5G or 6G radio access network and the second wireless network may be a WLAN.

DETAILED DESCRIPTION

Figure 1:
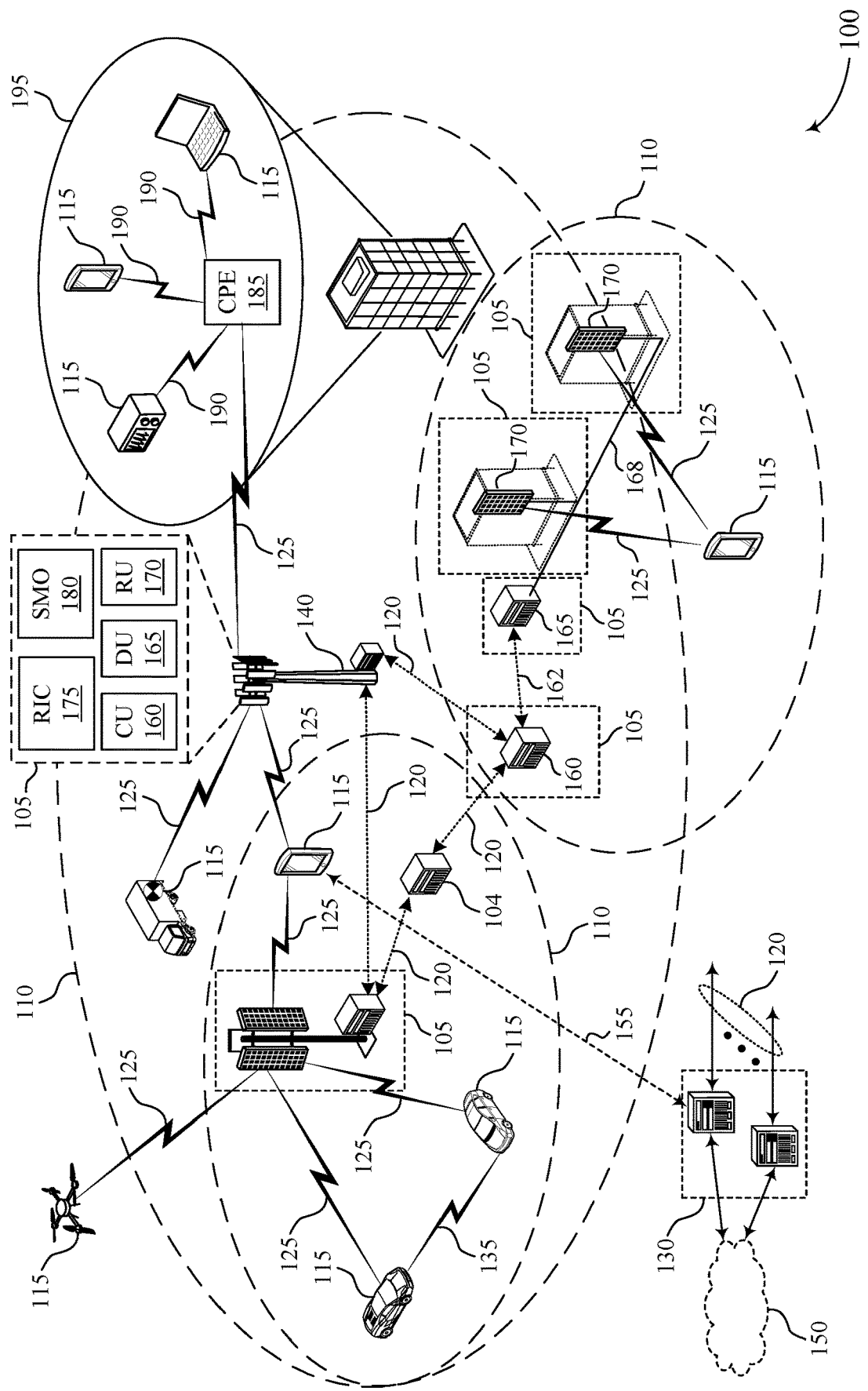
FIG. 1 illustrates an example of a wireless communications system that supports multicast traffic scheduling across multiple radio access technologies (RATs) in accordance with one or more aspects of the present disclosure.

In some wireless communications systems, fixed wireless access (FWA) deployments may be used in which a wireless device of a wireless local area network (e.g., a Wi-Fi Access Point (AP)) may carry a last segment of traffic between a wide area network (e.g., a fifth generation (5G) or sixth generation (6G) wireless communications system) and one or more endpoint devices (e.g., a user equipment (UE) or end user device). In some cases, the wide area network (WAN) may transmit multicast and broadcast services (MBS) traffic to multiple users, some of which may receive the MBS traffic via a wireless local area network (WLAN) that receives the traffic from the WAN and provides it to associated users. For example, a Wi-Fi AP may be communicate with a 5G modem (e.g., in a customer premises equipment (CPE) that includes both a 5G modem and a WLAN AP), where the 5G modem receives MBS traffic via a 5G network (e.g., a first radio access network (RAN) that uses a first RAT, and the AP uses a Wi-Fi connection (e.g., a second RAN that uses a second RAT) to complete the link to multiple users. In some cases, the 5G modem may have relatively good channel conditions and radio connectivity to the 5G network, and the network may operate based on such conditions (e.g., data rates are based on relatively good channel conditions between the 5G modem and a 5G serving cell).

However, in some cases the WLAN may be serving multiple different streams that may result in a bottleneck for the MBS traffic, which may result in delays in the MBS traffic and a poor user experience in cases where the MBS traffic is delay sensitive. Such a bottleneck may occur, for example, due to a scheduler at the WLAN (e.g., a scheduler of the Wi-Fi AP) being unaware that the MBS traffic is delay sensitive and serving other traffic that is more delay tolerant (e.g., enhanced mobile broadband (eMBB) traffic, or other background (BK) or best-efforts (BE) traffic) ahead of the MBS traffic. In cases where MBS traffic experiences such delays, it may result in quality of service (QoS) targets not being met for the MBS traffic, even though the 5G network has information that indicates the relatively good channel conditions at the 5G modem. Thus, enhanced techniques to allow for a LAN using a second RAN (e.g., a Wi-Fi network) to provide appropriate prioritization for MBS traffic of a first RAN (e.g., a 5G network) for a 'last mile' of connectivity between the first RAN and a UE may help to enhance user experience, maintain MBS QoS targets, and enhance reliability and network efficiency.

In accordance with various aspects discussed herein, a WAN modem (e.g., a 5G modem that provides connectivity with a 5G network) may provide MBS information to a LAN scheduler (e.g., a Wi-Fi scheduler of a Wi-Fi AP) related to MBS traffic that is carried via both the WAN and LAN to one or more end users. The information related to the MBS traffic may be passed from the WAN modem to the LAN scheduler along with the MBS data, or separately from the MBS data. In some cases, the MBS information may be used to provide prioritization at the LAN scheduler. In some cases, the LAN scheduler may prioritize traffic communications via the LAN based on any combinations of a number of clients, QoS parameters (e.g., 5QI parameters provided with some 5G communications and associated thresholds), a bandwidth of the traffic (e.g., whether the bandwidth is above or below a threshold value), LAN client capability (e.g., capabilities of a Wi-Fi device such as a station (STA) or user equipment (UE) for multiple access communications such as OFDMA/MU-MIMO), the presence of non-MBS flows, a feedback technique for the MBS data (e.g., communications that are not configured for acknowledgment/ negative-acknowledgment (ACK/NACK) feedback may have a lower QoS target relative to communications that use NACK-only or ACK/NACK feedback). The LAN scheduler may receive the MBS information and prioritize the MBS traffic ahead of other more delay-tolerant traffic (e.g., BK or BE traffic), which can enhance efficiency and provide MBS services with appropriate quality. In some cases, the LAN scheduler may place the MBS data in an access category (AC) queue based on the MBS information. Additionally, or alternatively, the LAN scheduler may implement a separate AC transmit queue for low latency traffic based on the MBS information.

Aspects of the disclosure are initially described in the context of wireless communications systems. Aspects of the disclosure are further illustrated by and described with reference to process flows, AC queues, apparatus diagrams, system diagrams, and flowcharts that relate to multicast traffic scheduling across multiple RATs.

FIG. 1 illustrates an example of a wireless communications system 100 that supports multicast traffic scheduling across multiple RATs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, an endpoint device, a CPE, a computing system, one or more components, or another suitable processing entity configured to perform any of the techniques described herein. For example, a node may be a UE 115. As another example, a node may be a network entity 105 or a CPE 185. As another example, a first node may be configured to communicate with a second node or a third node. In one aspect of this example, the first node may be a UE 115, the second node may be a network entity 105 or CPE 185, and the third node may be a UE 115. In another aspect of this example, the first node may be a UE 115, the second node may be a network entity 105 or CPE 185, and the third node may be a network entity 105 or CPE 185. In yet other aspects of this example, the first, second, and third nodes may be different relative to these examples. Similarly, reference to a UE 115, network entity 105, CPE 185, apparatus, device, computing system, or the like may include disclosure of the UE 115, network entity 105, CPE 185, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multicast traffic scheduling across multiple RATs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, and endpoint device, or a subscriber device, or some other suitable terminology, where the "device" may also be referred to as a unit, a station, a terminal, or a client, among other examples. A UE 115 may also act as a CPE in some cases. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, communication links 125 may use a first RAT (e.g., a 5G or a 6G RAT) and a connection for some UEs 115 may be provided using multiple RATs. For example, some UEs 115 located in proximity to a CPE 185 may be served using links 190 of a second RAT (e.g., via a Wi-Fi WLAN in Wi-Fi coverage area 195 served by CPE 185), where the CPE 185 communicates with a network entity 105 via using the first RAT via a communication link 125. In accordance with various aspects discussed herein, a scheduler associated with the second RAT may prioritize some communications received via the first RAT based on one or more parameters associated with the communications of the first RAT. For example, MBS communications of the first RAT may be prioritized by the scheduler associated with the second RAT based on MBS information with one or more parameters provided with the MBS communications, where the one or more parameters are associated with the communications of the first RAT. Several examples of communications over multiple RATs are discussed with reference to FIGS. 2 through 6.

Figure 2:
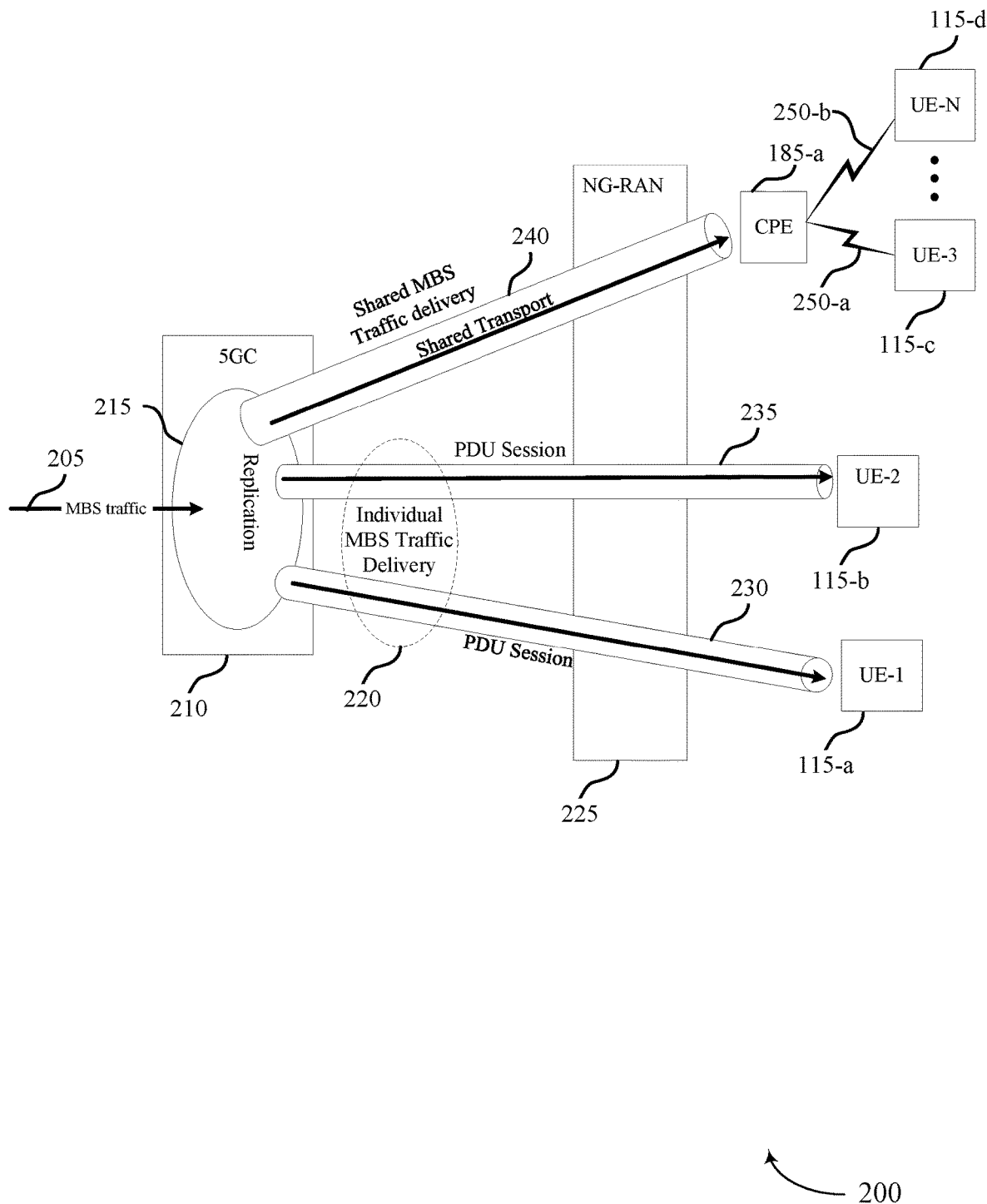
FIG. 2 illustrates an example of multicast and broadcast service (MBS) traffic delivery via a wireless communications system that supports multicast traffic scheduling across multiple RATs in accordance with one or more aspects of the present disclosure.

FIG. 2 illustrates an example of MBS traffic delivery via a wireless communications system 200 that supports multicast traffic scheduling across multiple RATs in accordance with one or more aspects of the present disclosure. The wireless communications system 200 includes a first UE 115-*a*, a second UE 115-*b*, a third UE 115-*c*, and a fourth UE 115-*d*, which may be examples of UEs 115 described with reference to FIG. 1. The wireless communications system 200 in this example includes a core network 210 (e.g., 5GC, or a core network 130 described with reference to FIG. 1) and a first RAN 225 (e.g., NG-RAN) that includes one or more network entities (e.g., network entities 105 described with reference to FIG. 1) that provide the radio air interface between the first RAN 225 and UEs 115 or a CPE 185-*a* using a first RAT. Further, the CPE 185-*a* may provide wireless communications using a second RAT (e.g., Wi-Fi) to one or more UEs 115.

In the example of FIG. 2, MBS traffic 205 may be received at the core network 210 and transmitted to multiple UEs 115. The MBS traffic 205 may provide data for one or more of multiple use cases, such as live streaming of events using a multicast subscription-based model, broadcast services, delay sensitive signaling, or high resolution Internet protocol television (IPTV), to provide a few examples. In some cases, a replication function 215 at the core network 210 may replicate the MBS traffic 205 for the multiple UEs for transmission via individual MBS traffic delivery 220 for individual UEs 115 (e.g., a point-to-point (PTP) MBS flow), or for transmission via shared MBS traffic delivery 240 to two or more UEs 115 (e.g., a point-to-multipoint (PTM) MBS flow). In this example, a first PDU session 230 for individual MBS traffic delivery 220 may be established for the first UE 115-*a*, and a second PDU session 235 for individual MBS traffic delivery 220 may be established for the second UE 115-*b*. Further, a shared transport for shared MBS traffic delivery 240 to both the third UE 115-*c* and fourth UE 115-*d*. In this example, the shared MBS traffic delivery 240 may be transported via the first RAN 225 to CPE 185-*a*, and the CPE 185-*a* may provide the MBS traffic 205 to the third UE 115-*c*, the fourth UE 115-*d*, one or more other UEs, or any combinations thereof. For example the CPE 185-*a* may use a first Wi-Fi link 250-*a* (e.g., a link 190 described with reference to FIG. 1) for communications with the third UE 115-*c* and may use a second Wi-Fi link 250-*b* (e.g., a link 190 described with reference to FIG. 1) for communications with the fourth UE 115-*d*. In some cases, the first RAN 225 that is capable of MBS may determine dynamically whether to do a PTP or PTM for UEs 115 that are to receive the MBS traffic 205, based on several factors such as proximity to a same transmission-reception point (TRP) of the first RAN 225, characteristics of MBS traffic 205 to be transmitted (e.g., an initial transmission or retransmission, delay tolerance of the data, etc.), channel conditions observed at the UEs 115, and the like.

In some cases, the CPE 185-*a* may provide a 'list mile' of connectivity between the core network 210 and the third UE 115-*c* and the fourth UE 115-*d*, which may help enhance efficiency and reliability of communications between the core network 210 and the third UE 115-*c* and fourth UE 115-*d*. For example, the third UE 115-*c* and the fourth UE 115-*d* may be located in a structure that prevents a reliable connection with the first RAN 225 using the first RAT, but may have a reliable connected with the CPE 185-*a* using the second RAT. The CPE 185-*a*, in turn, may be located at or in the structure at a location that provides a reliable connection with the first RAN 225 using the first RAT, and thus using both the first RAT and the second RAT may provide effective and reliable end-to-end connections for the third UE 115-*c* and the fourth UE 115-*d*. In some cases, providing a last portion of a wireless connection using the CPE 185-*a* may be referred to a fixed wireless access (FWA). The CPE 185-*a* may include, for example, a mobile router, a soft-AP CPE, a gateway CPE, or an outdoor unit (ODU) that may have an associated indoor AP, for example.

In some cases, MBS traffic 205 may be received (via the first RAN 225) at the CPE 185-*a*, where the CPE 185-*a* has a WAN interface (e.g., a 5G RAN interface) and an Ethernet or Wi-Fi interface (or both) for LAN clients such as the third UE 115-*c* and the fourth UE 115.*d*. However, existing LAN systems, upon receipt of the MBS traffic 205, may place the associated data in a buffer for transmission via the second RAT and the WAN may consider the associated data as being successfully received. As discussed herein, in the event that the MBS traffic 205 is placed in a traditional buffer for transmission, other traffic at the CPE may result in the MBS traffic 205 being delayed. Such a delay may result in QoS targets for the MBS traffic 205 not being met. Further, in some cases a relatively large number of UEs 115 may be served via the CPE 185-*a*, with multiple instances of the MBS traffic 205 being placed in the buffer for transmission to the UEs 115. In some cases, the second RAT may provide a multicast and broadcast mode, but such modes may provide relatively low data rates (e.g., due to such transmissions being set to a lowest possible decodable rate in order to be received by devices that may only support low rates).

In some cases, to provide higher effective data transfer rates the MBS traffic 205 may be converted to unicast data for each served client, which may be transmitted at substantially higher rates than available in the multicast and broadcast mode such that, even in cases where a large number of clients are to receive the MBS traffic 205, efficiency is enhanced through transmission of unicast data. Further, since the frames are transmitted as unicast, the transmission rates can be further enhanced based on the client receiving capability, and thus such techniques can provide more efficient airtime usage. As discussed above however, in cases where the MBS traffic 205 is placed in a transmit queue for each served client, latency due to other traffic may result in QoS targets of the MBS traffic 205 not being met, even when converted to unicast data for transmission to served clients. In some cases, the first RAN 225 may support QoS control per MBS session, where one or multiple QoS flows may be either a guaranteed bit rate (GBR) or non-GBR flow, for an MBS session. QoS flows may have associated QoS parameters (e.g., 5G QoS identifier (5QI) parameters), that are based on data that is transmitted via the flow.

In accordance with various aspects discussed herein, the CPE 185-*a* may provide information to enable MBS traffic 205 awareness at a WLAN scheduler. Such MBS traffic 205 awareness may help to improve user-experience and also may enhance overall network efficiency. In some cases, the WLAN scheduler may use the awareness of the MBS traffic to prioritize the MBS traffic with other WLAN traffic based on parameters of the MBS traffic 205. An example of a wireless communications system with a CPE 185 in accordance with various aspects of the disclosure is discussed with reference to FIG. 3.

Figure 3:
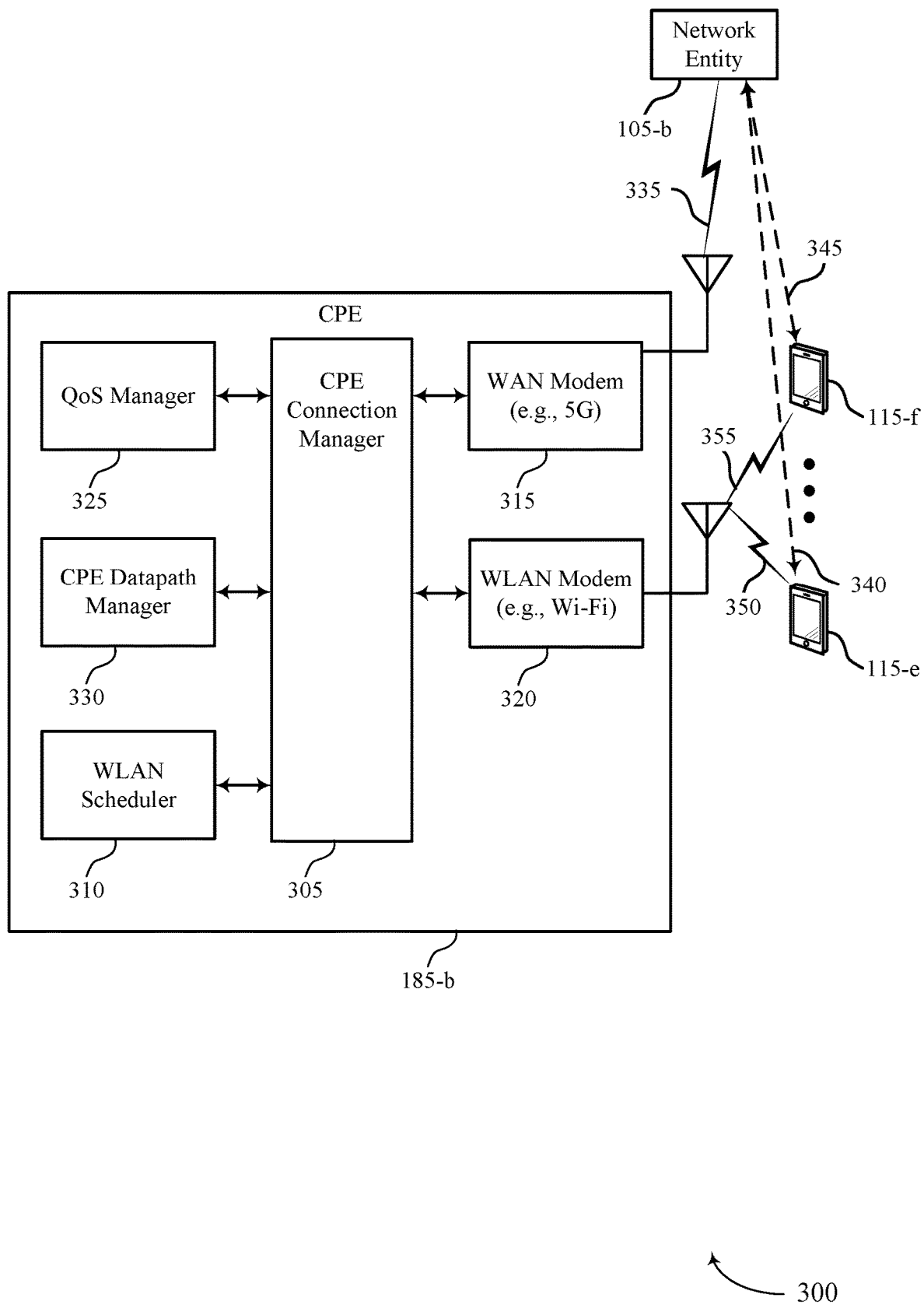
FIG. 3 illustrates an example of a wireless communications system with customer premises equipment (CPE) that supports multicast traffic scheduling across multiple RATs in accordance with one or more aspects of the present disclosure.

FIG. 3 illustrates an example of a wireless communications system 300 with CPE 185-*b* that supports multicast traffic scheduling across multiple RATs in accordance with one or more aspects of the present disclosure. The wireless communications system 300 includes a first UE 115-*e* through an n-th UE 115-*f*, which may be examples of UEs 115 described with reference to FIGS. 1 and 2. The wireless communications system 200 in this example includes a network entity 105-*b* and a CPE 185-*b*, which may be examples of network entities 105 and CPEs 185 described with reference to FIGS. 1 and 2. In this example, network entity 105-*b* may communicate with the CPE 185-*b* via a first link 335 using a first RAT (e.g., 5G), and the CPE 185-*b* may communicate with UEs 115-*e* through 115-*f* via second link 350 through n-th link 355 using a second RAT (e.g., Wi-Fi). In some cases, the network entity 105-*b* may communicate directly with one or more of the UEs 115 via associated links 340 through 345.

The CPE 185-*b* may include, in the example of FIG. 3, a CPE connection manager 305, a WLAN scheduler 310, a WAN modem 315 (e.g., a 5G or 6G modem that communicates in a first RAN according to a first RAT), a WLAN modem 320 (e.g., a Wi-Fi AP that communicates in a second RAN according to a second RAT), a QoS manager 325, and a CPE datapath manager 330. The CPE 185-*b* may include associated hardware and software to perform various techniques as discussed herein, such as modems and associated chipsets for communications (e.g., via multiple RANs, LANs, WANs, or combinations thereof), antennas for communications using different RATs, wireline ports for access to WANs/LANs (e.g., Ethernet, digital subscriber line (DSL), gigabit Ethernet passive optical network (GPON), etc.), one or more processors or controllers that provide various managers, and one or more memories that may buffer data and store instructions that may be executed perform one or more of the functions described herein.

As discussed herein, in some cases the CPE 185-*b* may receive MBS traffic, such as multicast data, from the first RAN, and transmit the MBS traffic to two or more served UEs 115-e through 115-f via the second RAN, such that a single packet of multicast data is transmitted in a one-to-many manner. In some cases, the CPE connection manager 305 may manage connections of the different networks, the WLAN scheduler 310, the QoS manager 325, and the CPE datapath manager 330. The QoS manager 325 may monitor and configure various QoS parameters for different data flows, including MBS data flows that are provided via the CPE 185-b. The CPE datapath manager 330 route various flows via different data paths based on information from the WLAN scheduler 310, one or more configured rules (e.g., QoS rules), or any combinations thereof. The WLAN scheduler 310, in conjunction with the datapath manager 330, may thus perform traffic steering, traffic switching, and the like, between different data paths for LAN or WAN communications.

In some cases, the WLAN scheduler 310 may provision one or more of the UEs 115 for a multicast session on the WAN using FWA LAN communications, and may prioritize data traffic associated with the multicast session based on an awareness of the multicast traffic and one or more parameters associated therewith. The WLAN scheduler 310 may use the multicast traffic awareness to manage a relatively large number of WLAN clients (e.g., UEs 115-e through 115-f) participating in the multicast session, which may result in a relatively large amount of air-time spent in transmitting multicast traffic, and may in some cases result in backpressure due to the one-to-many relationship between a multicast packet received via WAN modem 315 and associated multiple multicast packets transmitted via WLAN modem 320. In some cases, the CPE 185-b may have a shared buffer between the WLAN modem 320 and the WAN modem 315, and the multicast traffic awareness may allow for appropriate allocation of the shared buffer. The one or more parameters associated with the multicast traffic may also indicate a relatively high bandwidth versus relatively low bandwidth multicast, which may allow for appropriate allocation of resources for different traffic flows (e.g., the multicast data flow and one or more other LAN or WAN flows). Further, the one or more parameters associated with the multicast traffic may indicate whether the multicast traffic has a relatively high QoS or is delay critical, which may allow for WLAN scheduling that provides differentiated service (e.g., even within a same AC).

In accordance with various aspects, the WLAN scheduler 310 may use one or more parameters associated with a multicast flow to perform efficient WLAN scheduling. In some cases, the one or more parameters may include a number of served clients that are to receive the multicast flow, and the WLAN scheduler 310 may throttle the number of clients associated with a flow to provide enhanced overall system performance and network efficiency (e.g., based on a throttling configuration that is based on a FWA CPE configuration or that is received from a WAN core network, such as a threshold number of clients that may be served). In some cases, the one or more parameters may include 5QI parameters (e.g., a multicast flow with 5QI<82 may be less critical and be managed as part of standard AC queues, a multicast flow with 5QI≥82 may be delay critical and prioritized over other flows, and a multicast flow with 5QI=65 or 69 may be treated as the same as if 5QI≥82).

In some cases, the one or more parameters may include a bandwidth of the multicast flow, which may allow for more efficient scheduling based on expected data rates. In some cases, the one or more parameters may include a capability of each WLAN client, such as first UE 115-e through n-th UE 115-f, which may allow for multiple-access techniques to be implemented. For example, if the UEs 115-e through 115-f are capable of OFDMA or MU-MIMO, the WLAN scheduler 310 may use OFDMA or MU-MIMO for the multicast flow, and if one or more of the UEs 115-e through 115-f are capable of single user (SU) operation the WLAN scheduler may use SU communications for the multicast flow to such UEs 115. In some cases, the one or more parameters may include a number of non-multicast MBS flows, which may indicate resources that may be needed for such flows. In some cases, the one or more parameters may include a feedback configuration for the multicast flow, which may indicate a QoS or delay criticality of the MBS flow. For example, a relatively low QoS may be indicated if the multicast flow is configured with no HARQ ACK/NACK feedback, a higher QoS may be indicated if the multicast flow is configured with NACK-only feedback, and a highest QoS may be indicated if the multicast flow is configured with ACK/NACK feedback.

Figure 4:
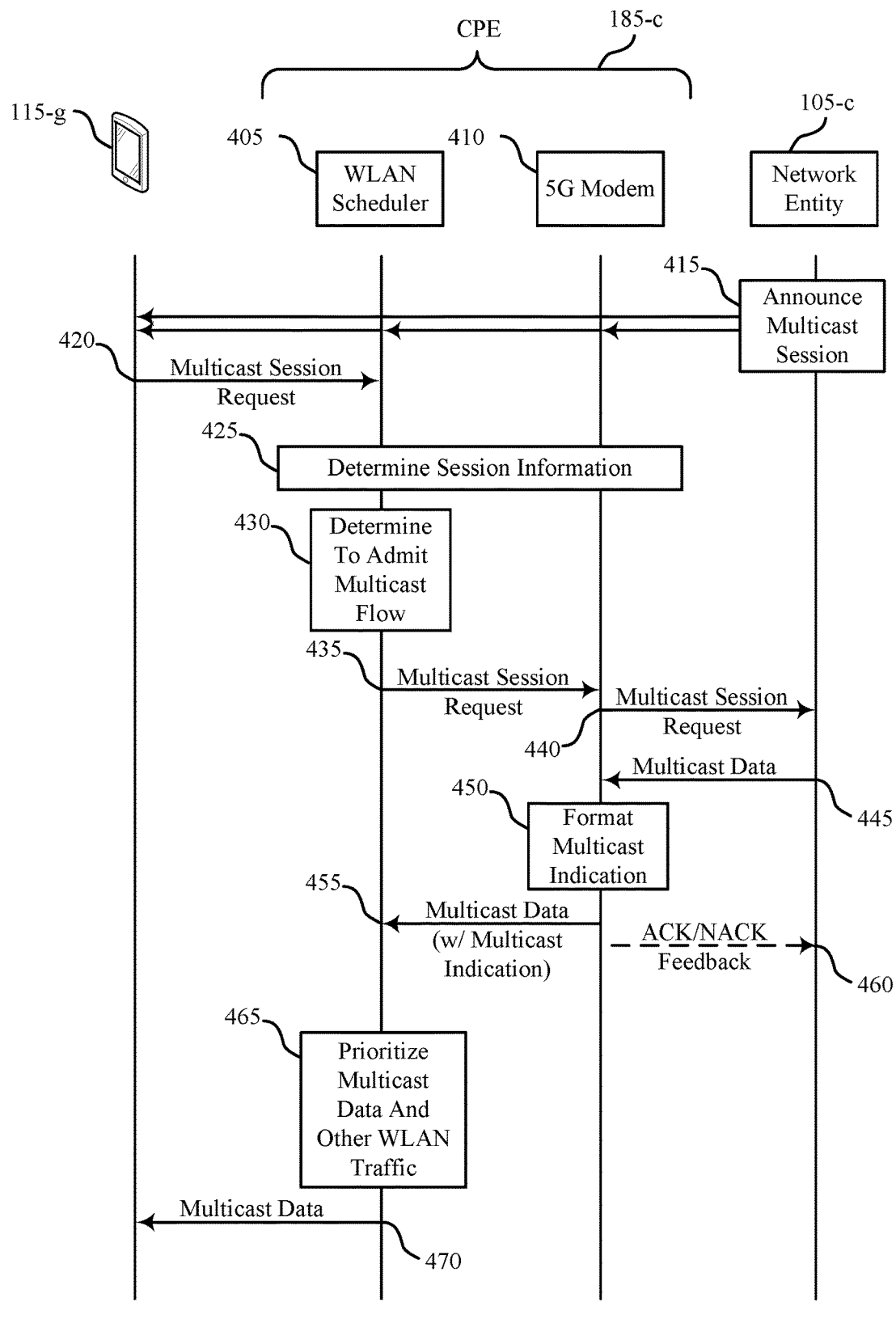
FIG. 4 illustrates an example of a process flow that supports multicast traffic scheduling across multiple RATs in accordance with one or more aspects of the present disclosure.

FIG. 4 illustrates an example of a process flow 400 that supports multicast traffic scheduling across multiple RATs in accordance with one or more aspects of the present disclosure. Process flow 400 includes a UE 115-g, which may be an example of UEs 115 described with reference to FIGS. 1-3. Process flow 400 also includes a network entity 105-c, and a CPE 185-c that includes a WLAN scheduler 405, and a 5G modem 410, which may be examples of corresponding devices described with reference to FIGS. 1-3. The process flow 400 may implement aspects of wireless communications system 100, 200, or 300. For example, the process flow 400 may support multicast traffic scheduling across multiple RATs.

In the following description of the process flow 400, the signaling exchanged between the UE 115-g, WLAN scheduler 405, 5G modem 410, and the network entity 105-c, may be exchanged in a different order than the example order shown, or the operations performed by the UE 115-g, WLAN scheduler 405, 5G modem 410, and the network entity 105-c, may be performed in different orders or at different times. Some operations may also be omitted from the process flow 400, and other operations may be added to the process flow 400. Further, the WLAN scheduler 405 and 5G modem 410 are shown for purposes of illustration and discussion only, and techniques as discussed herein may be applied to other RANs/RATs.

At 415, the network entity 105-c may announce a multicast session. In some cases, the multicast session may provide a live stream of an event using a multicast subscription-based model, critical delay-sensitive signaling, high resolution IPTV, or the like. In some cases, the announcement of the multicast session may provide one or more parameters associated with the session, such as an expected bandwidth or data rate, a periodicity of multicast transmissions, a feedback configuration, a QoS for the multicast flow, or any combinations thereof. The announcement of the multicast session may be provided, for example, in MBS configuration information provided in a medium access control (MAC) control element (CE), or in other control information or system information. In some cases, the multicast session announcement may be received directly by the UE 115-g via the 5G RAN, or may be received according to a FWA configuration via CPE 185-c and a WLAN associated with WLAN scheduler 405.

At 420, the UE 115-g may transmit a multicast session request to the WLAN scheduler 405. In some cases, the UE 115-g may be configured for FWA via the WLAN associated with CPE 185-c, and may transmit the multicast session request based on the multicast session announcement. At 425, the WLAN scheduler 405 and the 5G modem 410 may exchange information related to the multicast session. For example, the WLAN scheduler 405 and the 5G modem 410 may exchange information related to the multicast session, such as 5QI information, bandwidth of the multicast flow, a feedback configuration for the multicast flow, or any combinations thereof.

At 430, the WLAN scheduler 405 may determine to admit the multicast flow. In some cases, the determination may be based on one or more parameters a of the multicast session, such as the information exchanged with the 5G modem related to the multicast session, a number of clients that requested the multicast session, a capability of the clients that requested the multicast session, a number of non-MBS flows served by the CPE 185-c, or any combinations thereof. In some cases, a multicast session from the LAN is serviced/admitted only if a number of clients is under an acceptable limit (e.g., a configured threshold value), one or more QoS constraints relative to 5QI are met, a capability of served UEs 115 for OFDMA or MU-MIMO (e.g., a flow for UEs with OFDMA/MU-MIMO capability are given preference SU flows for scheduling of Multicast traffic), a failure rate of a client (e.g., if a number of transmit failures of a specific client exceeds a threshold, that client may be removed from a multicast session), or any combination thereof. An example of a multicast service admission, and associated prioritization, is discussed with reference to FIG. 5. In some cases, to avoid contention from other flows, an alternate AC queue for low-latency multicast may be implemented (e.g., for multicast flows having 5QI>82). An example of such an alternate AC queue is discussed with reference to FIG. 6.

At 435, based on the determination to admit the multicast flow, the WLAN scheduler 405 may transmit a multicast session request to the 5G modem 410. At 440, the 5G modem 410 may transmit the multicast session request to the network entity 105-c. At 445, the network entity 105-c may transmit multicast data to the 5G modem 410, based on the multicast session request.

At 450, the 5G modem may format a multicast indication associated with the multicast flow. In some cases, the multicast indication may provide one or more parameters associated with the multicast flow, or may indicate an ID of a multicast session associated with a prior multicast session request. In some cases, the multicast indication may be provided to the WLAN scheduler 405 with multicast data, at 455, or may be provided separately from the multicast data. At 460, in some cases where the multicast flow has NACK or ACK/NACK feedback configured, the 5G modem 410 may transmit ACK/NACK feedback to the network entity 105-c.

At 465, the WLAN scheduler 405 may prioritize the multicast data and other WLAN traffic. In some cases, the multicast data is prioritized based on the one or more parameters associated with the multicast session, as discussed herein. At 470, the WLAN scheduler 405 may schedule the multicast data for transmission by a WLAN modem (e.g., a Wi-Fi modem) to the UE 115-g.

Figure 5:
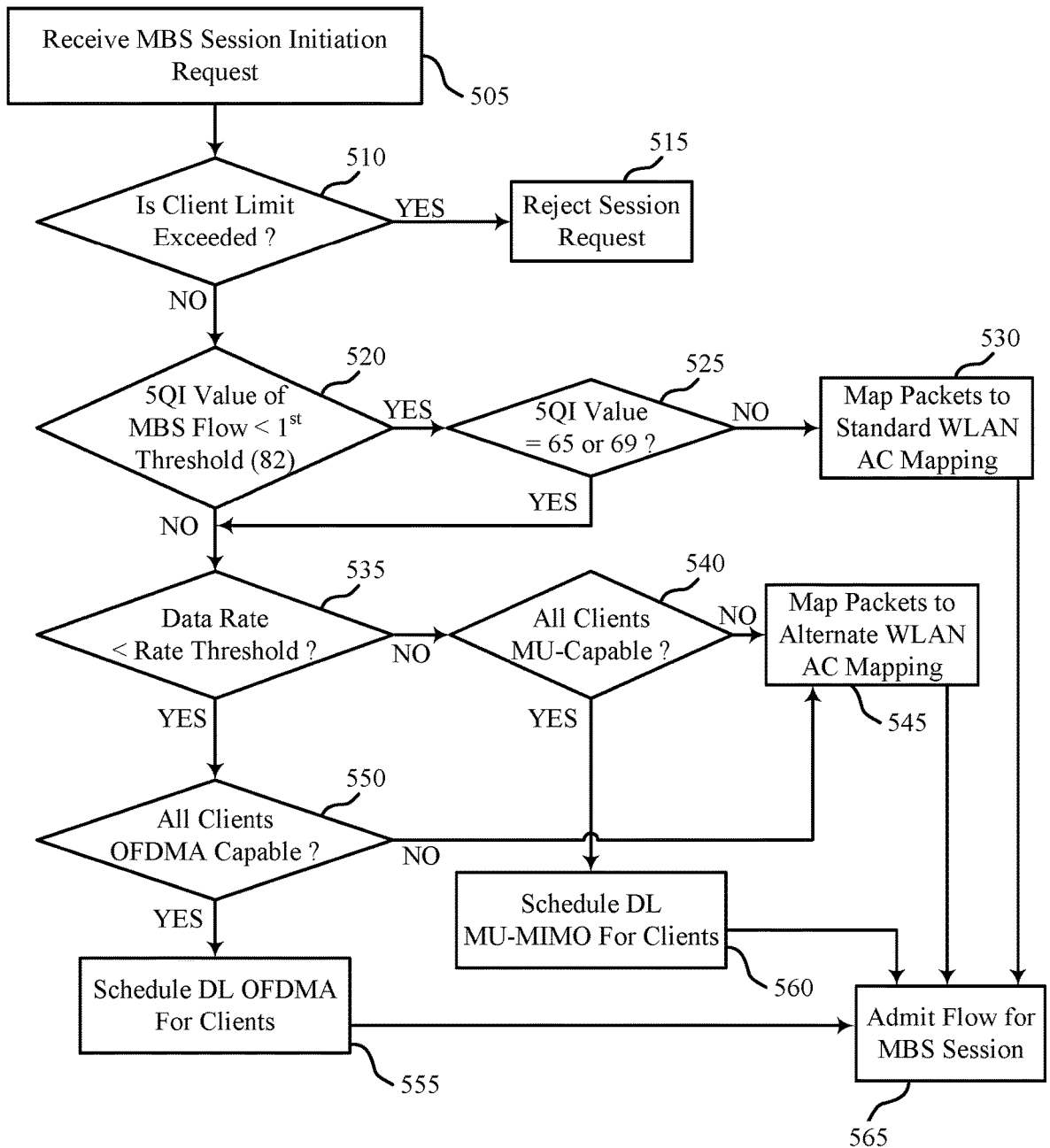
FIG. 5 illustrates an example of a flow chart that illustrates multicast traffic scheduling across multiple RATs in accordance with one or more aspects of the present disclosure.

FIG. 5 illustrates an example of a flow chart 500 that supports multicast traffic scheduling across multiple RATs in accordance with one or more aspects of the present disclosure. The flow chart 500 may be implemented in a system that supports multicast traffic scheduling across multiple RATs, such as described with reference to FIGS. 1 through 4. The operations as discussed with reference to flow chart 500 may be performed by one or more components of a CPE, such as a WLAN scheduler, as discussed herein.

At 505, the WLAN scheduler may receive an MBS session initiation request. In some cases, the MBS session initiation request may be received from a UE in a FWA configuration on which the CPE communicates with a first RAN using a first RAT, and the CPE communicates with the UE in a second RAN using a second RAT.

At 510, the WLAN scheduler may determine if a client limit is exceeded for MBS sessions. In some cases, the client limit may be based on a FWA CPE limit, or may be based on configuration information from the first RAN. In some cases, the client limit may be set based on a capacity for multicast communications via the CPE, a number of clients served via the CPE, a type of service associated with the MBS session, or any combinations thereof. At 515, if it is determined at the client limit is exceeded, the WLAN scheduler may reject the session request. In some cases, the WLAN scheduler may provide an indication to the UE that the MBS session is rejected, and the UE may attempt to initiate the MBS session directly via the first RAN.

At 520, if it is determined that the client limit is not exceeded, the WLAN scheduler may determine if a QoS value is less than a first threshold value (e.g., a 5QI value is less than 82). At 525, if it is determined that the QoS value is less than the first threshold, the WLAN scheduler may determine if the QoS value has a specific value that corresponds to a higher priority service (e.g., a 5QI value of 65 or 69). At 530, if it is determined that the QoS threshold does not have the specific value, the WLAN scheduler may map packets of the MBS session to AC queues according to standard WLAN AC mapping, and at 565 the WLAN scheduler may admit the flow for the MBS session.

At 535, if the QoS value is greater than or equal to the first threshold value, or if the QoS value is equal to the specific value, the WLAN scheduler may determine if a data rate associated with the MBS session is less than a rate threshold value. At 540, if it is determined that the data rate is not less than the rate threshold value, the WLAN scheduler may determine whether all of the clients that requested the MBS session are MU-MIMO capable. At 545, if it is determined that all clients are not MU-MIMO capable, the WLAN scheduler may map packets of the MBS session to an alternate AC queue that is associated with low latency multicast communications, and at 565 the WLAN scheduler may admit the flow for the MBS session. At 560, if it is determined that all of the clients are MU-MIMO capable, the WLAN scheduler may schedule downlink MU-MIMO for the clients that requested the MBS session, and at 565 the WLAN scheduler may admit the flow for the MBS session.

At 550, if it is determined that the data rate is less than the data rate threshold, the WLAN scheduler may determine if all clients that requested the MBS flow are OFDMA capable. If all of the clients are not OFDMA capable, the WLAN scheduler, at 560, may map packets of the MBS session to the alternate AC queue that is associated with low latency multicast communications, and at 565 the WLAN scheduler may admit the flow for the MBS session. At 555, if it is determined that all the clients are OFDMA capable, the WLAN scheduler may schedule downlink OFDMA for the clients that requested the MBS session, and at 565 the WLAN scheduler may admit the flow for the MBS session.

Figure 6:
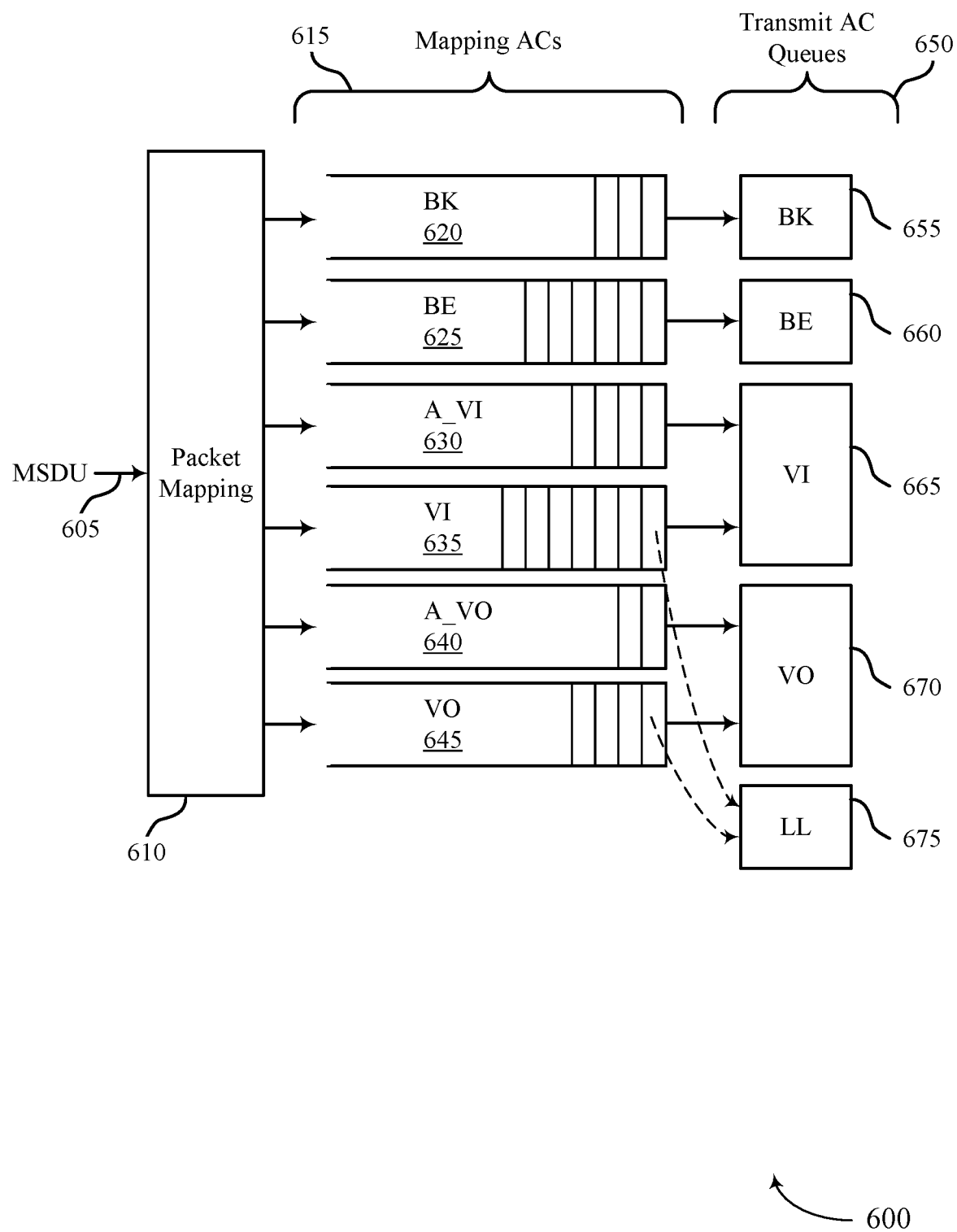
FIG. 6 illustrates an example of access category queues that support multicast traffic scheduling across multiple RATs in accordance with one or more aspects of the present disclosure.

FIG. 6 illustrates an example of access category queues 600 that support multicast traffic scheduling across multiple RATs in accordance with one or more aspects of the present disclosure. The access category queues 600 may be implemented in a system that supports multicast traffic scheduling across multiple RATs, such as in a wireless communications system as described with reference to FIGS. 1 through 5.

In the example, of FIG. 6, a WLAN scheduler, such as a WLAN scheduler of a FWA CPE, may have admitted a multicast flow as discussed herein (e.g., based on one or more parameters associated with the flow). The WLAN scheduler may receive a MAC service data unit (MSDU) 605, which may be provided to a packet mapping function 610. The packet mapping function 610 may map packets of the MSDU into one of multiple ACs 615, which include a background (BK) AC 620, a best efforts (BE) AC 625, an alternate video (A_VI) AC 630, a video (VI) AC 635, an alternate voice (A_VO) AC 640, and a voice (VO) AC 645. The mapped ACs may then be mapped to one of multiple transmit AC queues 650, in which the BK AC 620 is mapped to BK transit queue 655, the BE AC 625 is mapped to BE transmit queue 660, the A_VI AC 630 and VI AC 635 are mapped to VI transmit queue 665, and the A_VO AC 640 and the VO AC 645 are mapped to the VO transmit queue 670. In this example, for multicast packets that have a QoS value that exceeds a QoS threshold value (e.g., 5QI>82), or that have a prespecified QoS value (e.g., 5QI=65 or 69) from the VI AC 635 or the VO AC 645, may be mapped to an alternate low latency (LL) transmit queue 675. In such cases, the WLAN scheduler may schedule packets from the alternate LL transmit queue 675 before packets from other transmit queues 655 through 670. Thus, the relatively high QoS multicast packets may be provided with higher priority for transmission, and the WLAN scheduler may provide the multicast data with enhanced network efficiency and an enhanced user experience.

Figure 7:
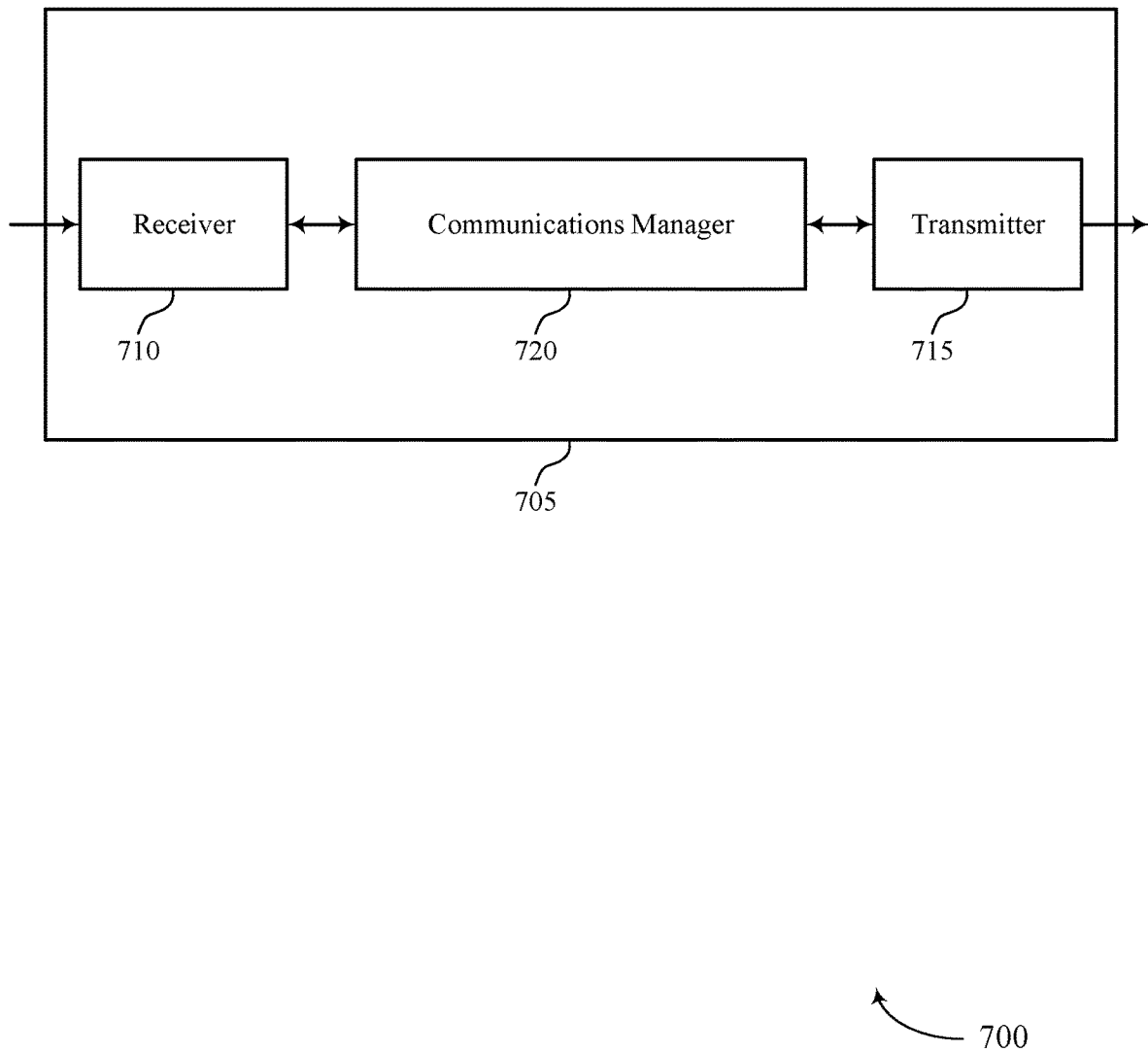
FIGS. 7 and 8 show block diagrams of devices that support multicast traffic scheduling across multiple RATs in accordance with one or more aspects of the present disclosure.

FIG. 7 shows a block diagram 700 of a device 705 that supports multicast traffic scheduling across multiple RATs in accordance with one or more aspects of the present disclosure. The device 705 may be an example of aspects of a UE 115, a CPE 185, or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multicast traffic scheduling across multiple RATs). Information may be passed on to other components of the device 705. The receiver 710 may utilize a single antenna or a set of multiple antennas. In some cases, the receiver 710 may include multiple receivers for different RATs (e.g., wireless modems for different RATs).

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multicast traffic scheduling across multiple RATs). In some examples, the transmitter 715 may be co-located with a receiver 710 in a transceiver module. The transmitter 715 may utilize a single antenna or a set of multiple antennas. In some cases, the transmitter 715 may include multiple transmitters for different RATs (e.g., wireless modems for different RATs).

The communications manager 720, the receiver 710, the transmitter 715, or various combinations thereof or various components thereof may be examples of means for performing various aspects of multicast traffic scheduling across multiple RATs as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The device 705 may support wireless communication in accordance with examples as disclosed herein. For example, the receiver 710 may be configured as or otherwise support a means for receiving multicast data associated with a multicast service via a first wireless network using a first RAT, where the multicast data is to be provided to one or more clients via a second wireless network using a second RAT, and where the multicast service has a set of multicast service parameters. The communications manager 720 may be configured as or otherwise support a means for transmitting, to a scheduler of the second wireless network (e.g., which may be contained within communication manager in some aspects), an information message that indicates one or more multicast service parameters of the set of multicast service parameters. The communications manager 720 may be configured as or otherwise support a means for transmitting the multicast data to the scheduler for transmission via the second wireless network.

Additionally, or alternatively, the device 705 may support wireless communication in accordance with examples as disclosed herein. For example, the communications manager 720 may be configured as or otherwise support a means for receiving, from a wireless modem, an information message that indicates one or more multicast service parameters associated with a multicast service that is provided via the wireless modem using a first wireless network that uses a first RAT. The communications manager 720 may be configured as or otherwise support a means for receiving, from the wireless modem, at least a first multicast data communication, where the first multicast data communication is to be transmitted to one or more clients via a second wireless network using a second RAT. The transmitter 715 may be configured as or otherwise support a means for transmitting the first multicast data communication to at least a first client via the second wireless network based on a prioritization of the first multicast data communication relative to one or more other data communications that are to be transmitted via the second wireless network, where the prioritization is based on the one or more multicast service parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for prioritization of multicast communications in traffic scheduling across multiple RATs that provide enhanced reliability for multicast flows that are transmitted across multiple RAT to a UE, enhance network efficiency, enable latency-sensitive multicast flows, and provide an enhanced user experience.

Figure 8:
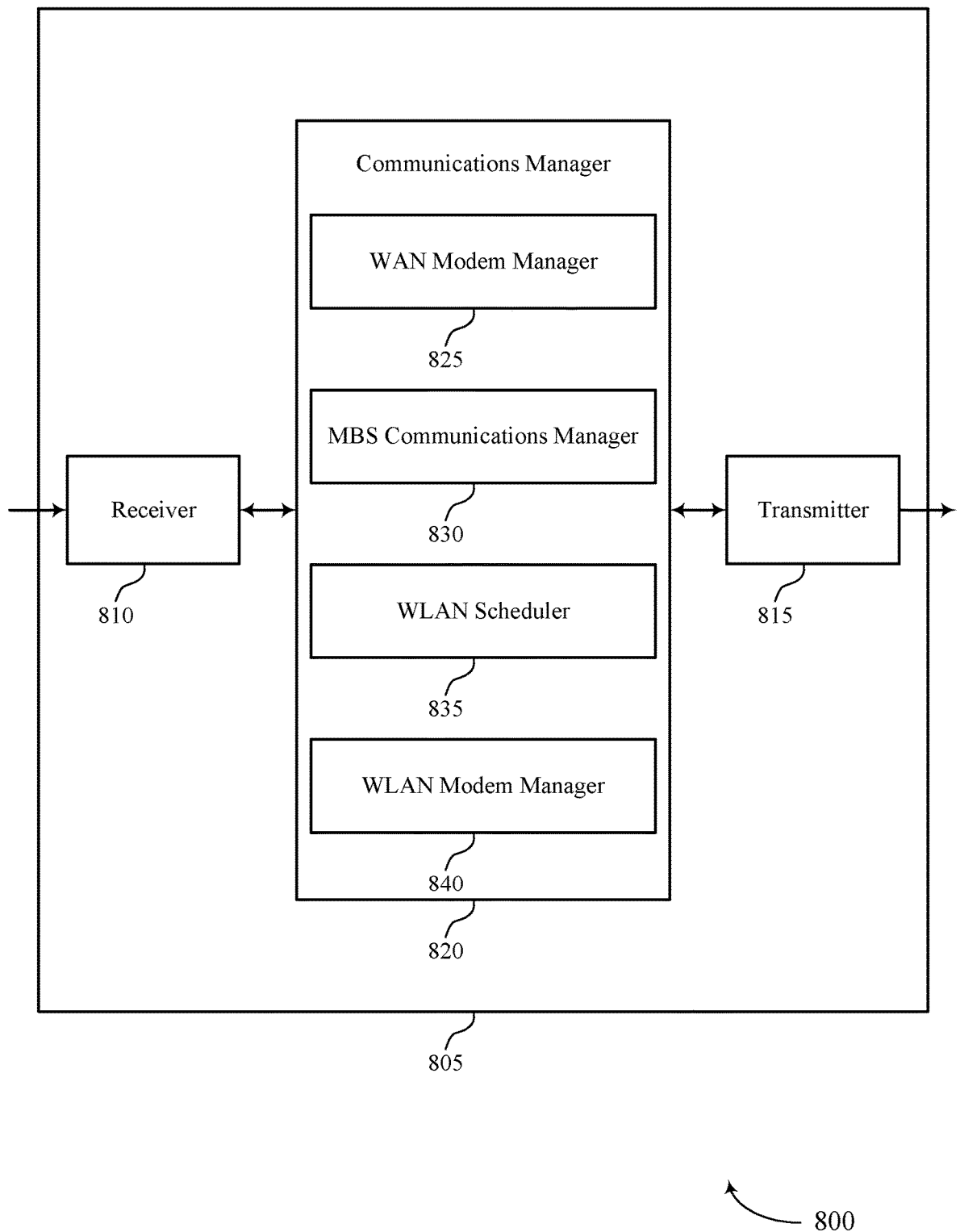

FIG. 8 shows a block diagram 800 of a device 805 that supports multicast traffic scheduling across multiple RATs in accordance with one or more aspects of the present disclosure. The device 805 may be an example of aspects of a device 705, a UE 115, a CPE 185, or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multicast traffic scheduling across multiple RATs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multicast traffic scheduling across multiple RATs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multicast traffic scheduling across multiple RATs as described herein. For example, the communications manager 820 may include a WAN modem manager 825, an MBS communications manager 830, a WLAN scheduler 835, a WLAN modem manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The WAN modem manager 825 may be configured as or otherwise support a means for receiving multicast data associated with a multicast service via a first wireless network using a first RAT, where the multicast data is to be provided to one or more clients via a second wireless network using a second RAT, and where the multicast service has a set of multicast service parameters. The MBS communications manager 830 may be configured as or otherwise support a means for transmitting, to a scheduler of the second wireless network, an information message that indicates one or more multicast service parameters of the set of multicast service parameters. The WAN modem manager 825 may be configured as or otherwise support a means for transmitting the multicast data to the scheduler for transmission via the second wireless network.

Additionally, or alternatively, the communications manager 820 may support wireless communication in accordance with examples as disclosed herein. The WLAN scheduler 835 may be configured as or otherwise support a means for receiving, from a wireless modem, an information message that indicates one or more multicast service parameters associated with a multicast service that is provided via the wireless modem using a first wireless network that uses a first RAT. The WLAN scheduler 835 may be configured as or otherwise support a means for receiving, from the wireless modem, at least a first multicast data communication, where the first multicast data communication is to be transmitted to one or more clients via a second wireless network using a second RAT. The WLAN modem manager 840 may be configured as or otherwise support a means for transmitting the first multicast data communication to at least a first client via the second wireless network based on a prioritization of the first multicast data communication relative to one or more other data communications that are to be transmitted via the second wireless network, where the prioritization is based on the one or more multicast service parameters.

Figure 9:
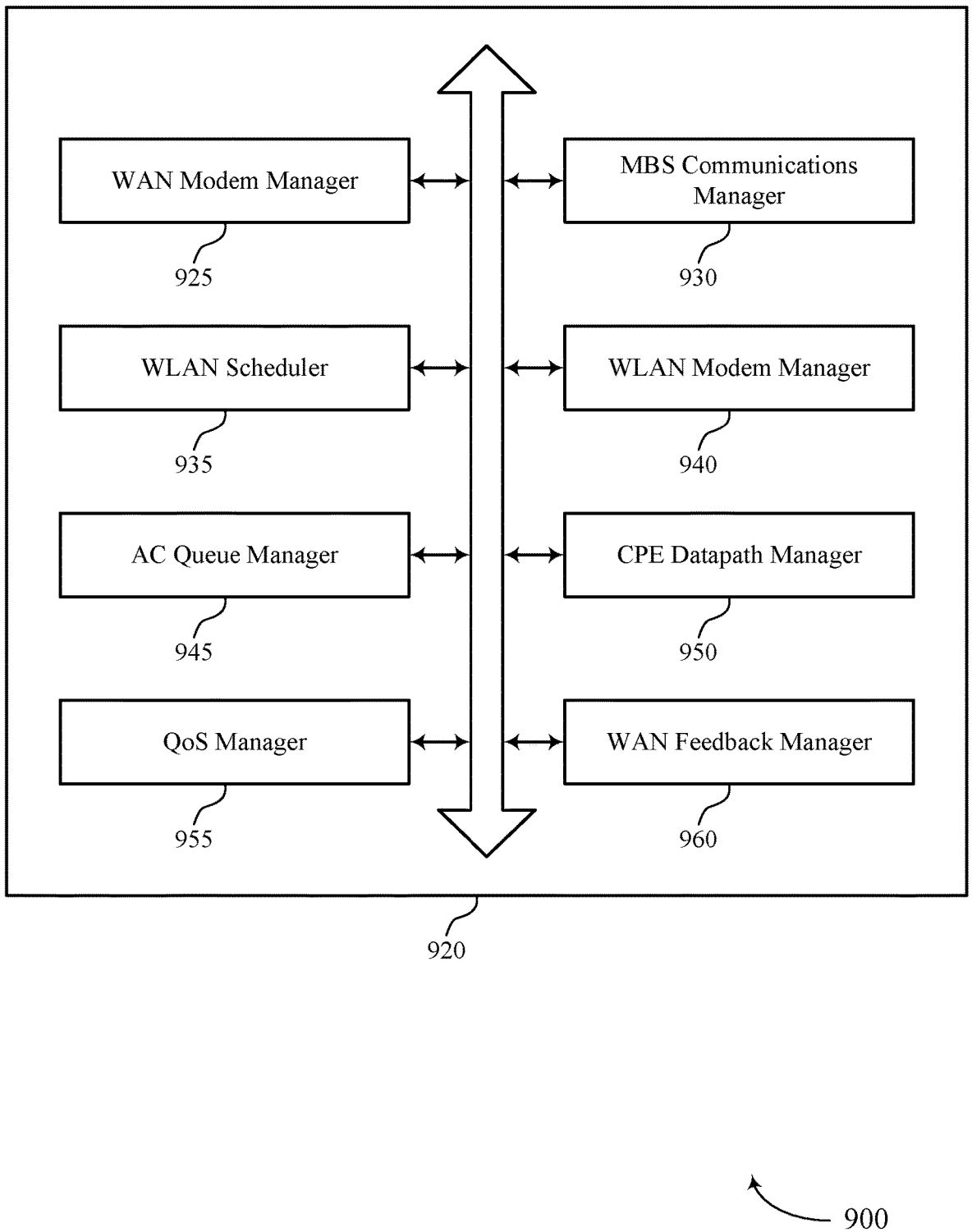
FIG. 9 shows a block diagram of a communications manager that supports multicast traffic scheduling across multiple RATs in accordance with one or more aspects of the present disclosure.

FIG. 9 shows a block diagram 900 of a communications manager 920 that supports multicast traffic scheduling across multiple RATs in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multicast traffic scheduling across multiple RATs as described herein. For example, the communications manager 920 may include a WAN modem manager 925, an MBS communications manager 930, a WLAN scheduler 935, a WLAN modem manager 940, an AC queue manager 945, a CPE datapath manager 950, a QoS manager 955, a WAN feedback manager 960, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communication in accordance with examples as disclosed herein. The WAN modem manager 925 may be configured as or otherwise support a means for receiving multicast data associated with a multicast service via a first wireless network using a first RAT, where the multicast data is to be provided to one or more clients via a second wireless network using a second RAT, and where the multicast service has a set of multicast service parameters. The MBS communications manager 930 may be configured as or otherwise support a means for transmitting, to a scheduler of the second wireless network, an information message that indicates one or more multicast service parameters of the set of multicast service parameters. In some examples, the WAN modem manager 925 may be configured as or otherwise support a means for transmitting the multicast data to the scheduler for transmission via the second wireless network.

In some examples, the MBS communications manager 930 may be configured as or otherwise support a means for receiving, from the scheduler, an indication to admit the multicast service or reject the multicast service, and where the transmitting the multicast data is performed responsive to the indication to admit the multicast service. In some examples, the set of multicast service parameters include one or more of a quantity of clients associated with the multicast service, one or more quality of service parameters, a data rate target of the multicast data, a quantity of non-multicast data flows to be communicated concurrently with the multicast service, or a feedback scheme associated with the multicast service. In some examples, the quantity of clients indicates a quantity of endpoint devices that are to be supported using the multicast service. In some examples, the one or more quality of service parameters indicate an amount of delay tolerance of the multicast data. In some examples, the feedback scheme associated with the multicast service indicates a no-feedback scheme, a NACK-only feedback scheme, or an ACK/NACK feedback scheme. In some examples, the first wireless network is a 5G or 6G radio access network and the second wireless network is a WLAN.

Additionally, or alternatively, the communications manager 920 may support wireless communication in accordance with examples as disclosed herein. The WLAN scheduler 935 may be configured as or otherwise support a means for receiving, from a wireless modem, an information message that indicates one or more multicast service parameters associated with a multicast service that is provided via the wireless modem using a first wireless network that uses a first RAT. In some examples, the WLAN scheduler 935 may be configured as or otherwise support a means for receiving, from the wireless modem, at least a first multicast data communication, where the first multicast data communication is to be transmitted to one or more clients via a second wireless network using a second RAT. The WLAN modem manager 940 may be configured as or otherwise support a means for transmitting the first multicast data communication to at least a first client via the second wireless network based on a prioritization of the first multicast data communication relative to one or more other data communications that are to be transmitted via the second wireless network, where the prioritization is based on the one or more multicast service parameters.

In some examples, the WLAN scheduler 935 may be configured as or otherwise support a means for determining, based on the one or more multicast service parameters, to admit or reject the multicast service. In some examples, the one or more multicast service parameters include one or more of a quantity of clients associated with the multicast service, one or more quality of service parameters associated with the multicast service, a data rate target of the multicast service, a quantity of non-multicast data flows to be communicated concurrently with the multicast service, a capability of each of the clients associated with the multicast service, or a feedback scheme associated with the multicast service.

In some examples, the WLAN scheduler 935 may be configured as or otherwise support a means for determining, based on the capability of each of the clients associated with the multicast service, to admit or reject the multicast service. In some examples, the capability of each of the clients includes an OFDMA capability or a MU-MIMO capability.

In some examples, the AC queue manager 945 may be configured as or otherwise support a means for mapping data communications associated with the multicast service to a separate AC transmit queue of the second wireless network. In some examples, the AC queue manager 945 may be configured as or otherwise support a means for scheduling data transmissions from the separate AC transmit queue to the one or more clients based on a higher priority of the separate AC transmit queue than one or more other AC transmit queues. In some examples, the mapping the data communications associated with the multicast service to the separate AC transmit queue is based on one or more QoS threshold values associated with the separate AC transmit queue and the one or more other AC queues, and a QoS associated with the multicast service that indicates an amount of delay tolerance of the multicast service.

In some examples, the mapping the data communications associated with the multicast service to the separate AC transmit queue is based on a feedback scheme of the multicast service, and where a no-feedback scheme or a NACK-only feedback scheme is mapped to a lower priority AC transmit queue and an ACK/NACK feedback scheme is mapped to the separate AC transmit queue that has higher priority than the one or more other AC queues. In some examples, the WLAN scheduler 935 may be configured as or otherwise support a means for determining, based on a quantity of the one or more clients that are to receive the multicast service, to admit or reject the multicast service.

In some examples, the CPE datapath manager 950 may be configured as or otherwise support a means for scheduling data transmissions associated with the multicast service using OFDMA or MU-MIMO based on an associated capability of each of the one or more clients and a data rate associated with the multicast service being above a data rate threshold value. In some examples, one or more threshold values associated with the one or more multicast service parameters are adjusted based on a quantity of other multicast service flows and other non-multicast service flows. In some examples, the first wireless network is a 5G or 6G radio access network and the second wireless network is a WLAN.

Figure 10:
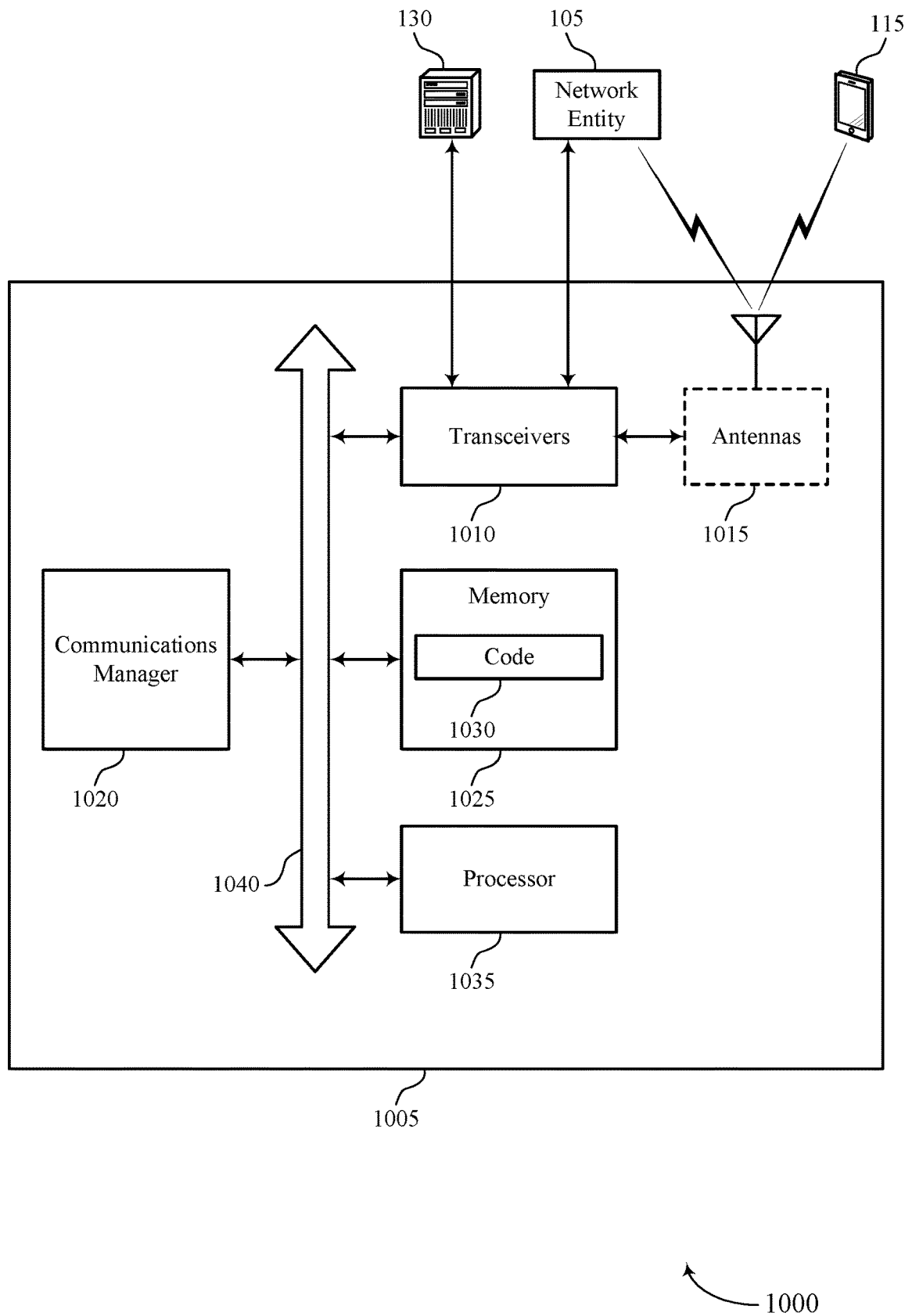
FIG. 10 shows a diagram of a system including a UE that supports multicast traffic scheduling across multiple RATs in accordance with one or more aspects of the present disclosure.

FIG. 10 shows a diagram of a system 1000 including a device 1005 that supports multicast traffic scheduling across multiple RATs in accordance with one or more aspects of the present disclosure. The device 1005 may be an example of or include the components of a device 705, a device 805, a CPE 185, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. The transceiver 1010, or the transceiver 1010 and one or more antennas 1015 or wired interfaces, where applicable, may be an example of a transmitter 715, a transmitter 815, a receiver 710, a receiver 810, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1025 may include random access memory (RAM) and read-only memory (ROM). The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a basic input/output (I/O) system (BIOS) which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting multicast traffic scheduling across multiple RATs). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communication in accordance with examples as disclosed herein. For example, the communications manager 1020 may be configured as or otherwise support a means for receiving multicast data associated with a multicast service via a first wireless network using a first RAT, where the multicast data is to be provided to one or more clients via a second wireless network using a second RAT, and where the multicast service has a set of multicast service parameters. The communications manager 1020 may be configured as or otherwise support a means for transmitting, to a scheduler of the second wireless network, an information message that indicates one or more multicast service parameters of the set of multicast service parameters. The communications manager 1020 may be configured as or otherwise support a means for transmitting the multicast data to the scheduler for transmission via the second wireless network.

Additionally, or alternatively, the communications manager 1020 may support wireless communication in accordance with examples as disclosed herein. For example, the communications manager 1020 may be configured as or otherwise support a means for receiving, from a wireless modem, an information message that indicates one or more multicast service parameters associated with a multicast service that is provided via the wireless modem using a first wireless network that uses a first RAT. The communications manager 1020 may be configured as or otherwise support a means for receiving, from the wireless modem, at least a first multicast data communication, where the first multicast data communication is to be transmitted to one or more clients via a second wireless network using a second RAT. The communications manager 1020 may be configured as or otherwise support a means for transmitting the first multicast data communication to at least a first client via the second wireless network based on a prioritization of the first multicast data communication relative to one or more other data communications that are to be transmitted via the second wireless network, where the prioritization is based on the one or more multicast service parameters.

By including or configuring the communications manager 1020 in accordance with examples as described herein, the device 1005 may support techniques for prioritization of multicast communications in traffic scheduling across multiple RATs that provide enhanced reliability for multicast flows that are transmitted across multiple RAT to a UE, enhance network efficiency, enable latency-sensitive multicast flows, and provide an enhanced user experience.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of multicast traffic scheduling across multiple RATs as described herein, or the processor 1035 and the memory 1025 may be otherwise configured to perform or support such operations.

Figure 11:
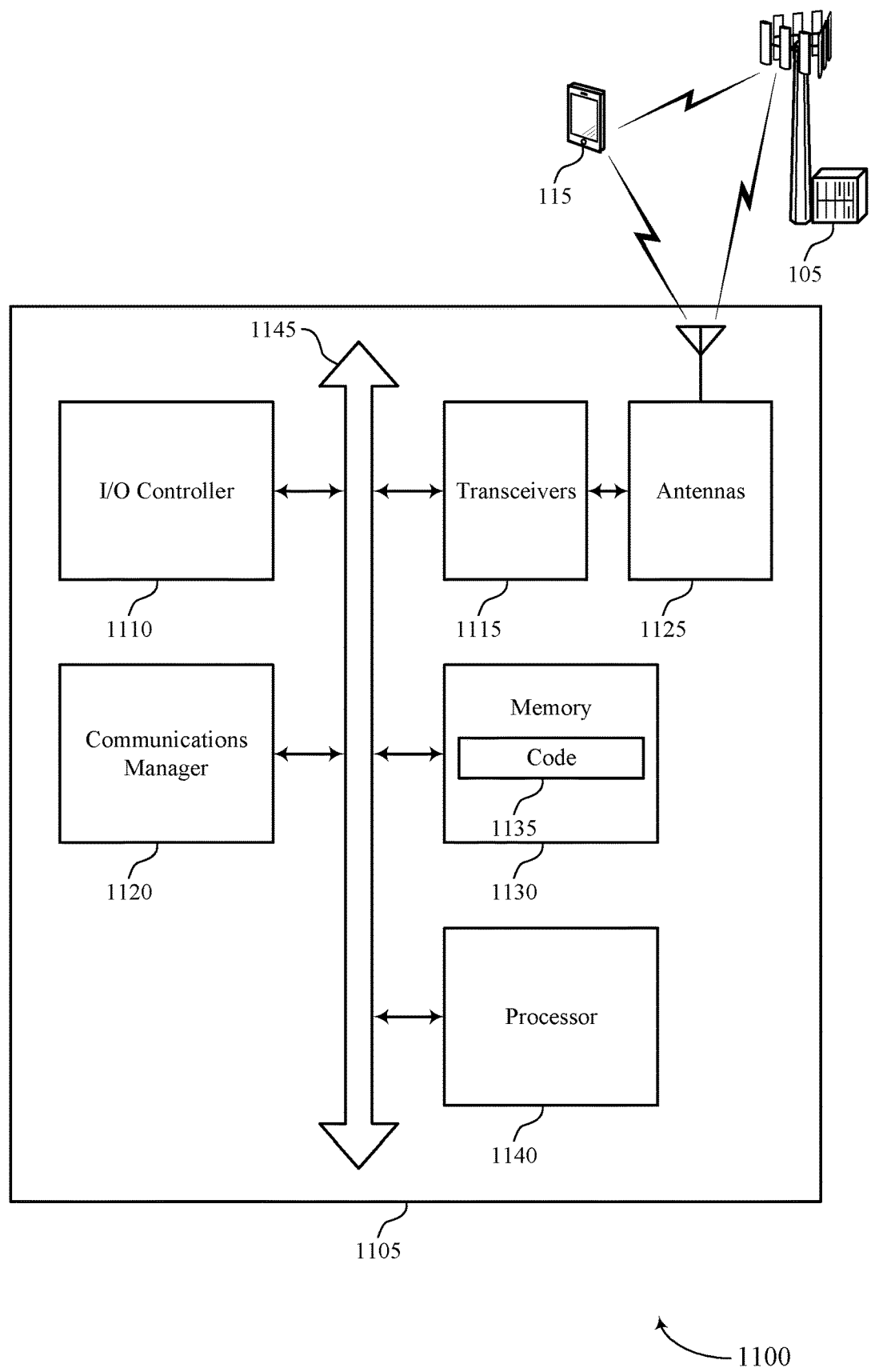
FIG. 11 shows a diagram of a system including a network entity that supports multicast traffic scheduling across multiple RATs in accordance with one or more aspects of the present disclosure.

FIG. 11 shows a diagram of a system 1100 including a device 1105 that supports multicast traffic scheduling across multiple RATs in accordance with one or more aspects of the present disclosure. The device 1105 may be an example of or include the components of a device 705, a device 805, a CPE 185, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 715, a transmitter 815, a receiver 710, a receiver 810, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multicast traffic scheduling across multiple RATs). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication in accordance with examples as disclosed herein. For example, the communications manager 1120 may be configured as or otherwise support a means for receiving multicast data associated with a multicast service via a first wireless network using a first RAT, where the multicast data is to be provided to one or more clients via a second wireless network using a second RAT, and where the multicast service has a set of multicast service parameters. The communications manager 1120 may be configured as or otherwise support a means for transmitting, to a scheduler of the second wireless network, an information message that indicates one or more multicast service parameters of the set of multicast service parameters. The communications manager 1120 may be configured as or otherwise support a means for transmitting the multicast data to the scheduler for transmission via the second wireless network.

Additionally, or alternatively, the communications manager 1120 may support wireless communication in accordance with examples as disclosed herein. For example, the communications manager 1120 may be configured as or otherwise support a means for receiving, from a wireless modem, an information message that indicates one or more multicast service parameters associated with a multicast service that is provided via the wireless modem using a first wireless network that uses a first RAT. The communications manager 1120 may be configured as or otherwise support a means for receiving, from the wireless modem, at least a first multicast data communication, where the first multicast data communication is to be transmitted to one or more clients via a second wireless network using a second RAT. The communications manager 1120 may be configured as or otherwise support a means for transmitting the first multicast data communication to at least a first client via the second wireless network based on a prioritization of the first multicast data communication relative to one or more other data communications that are to be transmitted via the second wireless network, where the prioritization is based on the one or more multicast service parameters.

By including or configuring the communications manager 1120 in accordance with examples as described herein, the device 1105 may support techniques for prioritization of multicast communications in traffic scheduling across multiple RATs that provide enhanced reliability for multicast flows that are transmitted across multiple RAT to a UE, enhance network efficiency, enable latency-sensitive multicast flows, and provide an enhanced user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multicast traffic scheduling across multiple RATs as described herein, or the processor 1140 and the memory 1130 may be otherwise configured to perform or support such operations.

Figure 12:
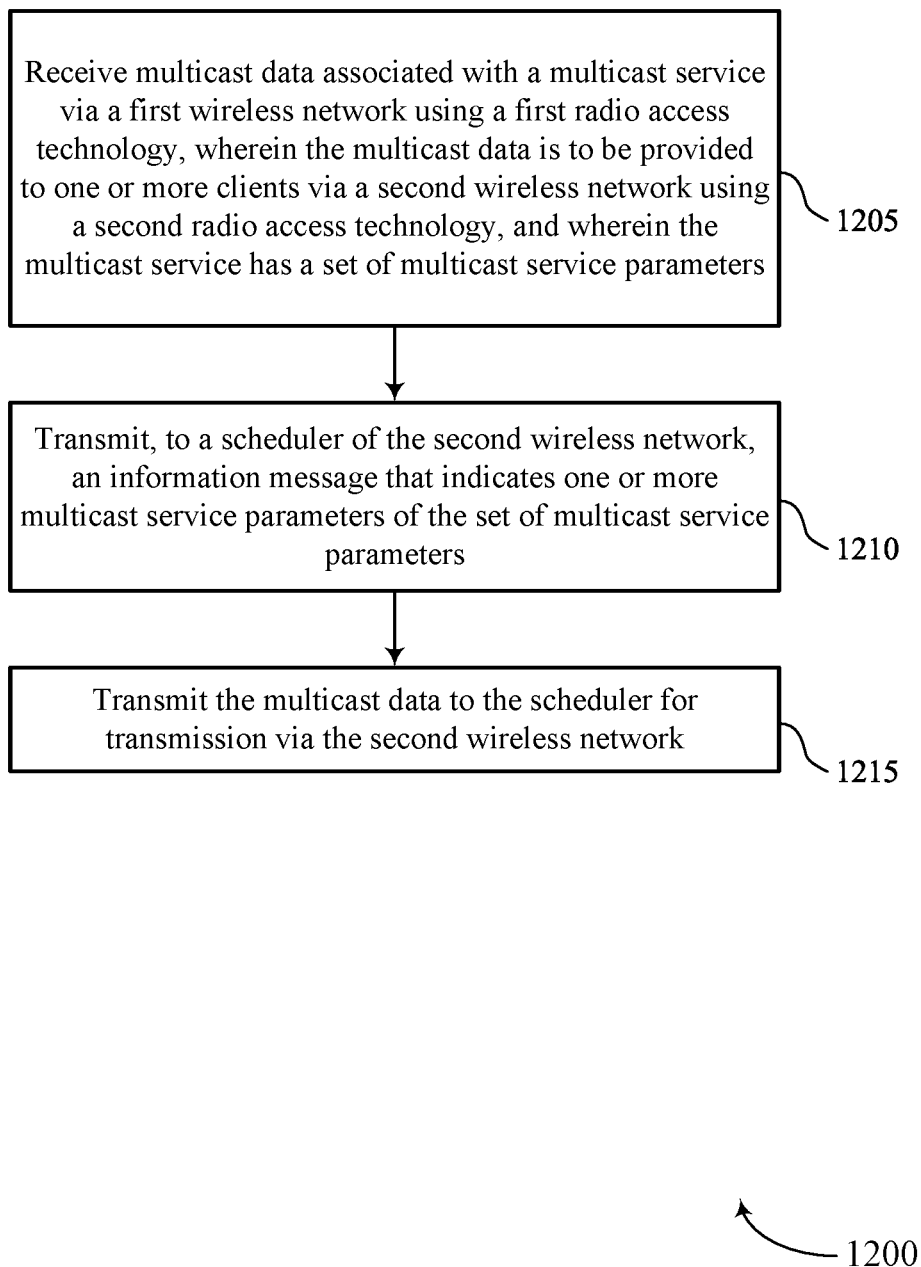
FIGS. 12 through 18 show flowcharts illustrating methods that support multicast traffic scheduling across multiple RATs in accordance with one or more aspects of the present disclosure.

FIG. 12 shows a flowchart illustrating a method 1200 that supports multicast traffic scheduling across multiple RATs in accordance with one or more aspects of the present disclosure. The operations of the method 1200 may be implemented by a network entity or a UE or its components as described herein. For example, the operations of the method 1200 may be performed by a network entity or a UE 115 as described with reference to FIGS. 1 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1205, the method may include receiving multicast data associated with a multicast service via a first wireless network using a first RAT, where the multicast data is to be provided to one or more clients via a second wireless network using a second RAT, and where the multicast service has a set of multicast service parameters. The operations of 1205 may be performed in accordance with examples as disclosed herein. In some examples, aspects of the operations of 1205 may be performed by a WAN modem manager 925 as described with reference to FIG. 9.

At 1210, the method may include transmitting, to a scheduler of the second wireless network, an information message that indicates one or more multicast service parameters of the set of multicast service parameters. The operations of 1210 may be performed in accordance with examples as disclosed herein. In some examples, aspects of the operations of 1210 may be performed by an MBS communications manager 930 as described with reference to FIG. 9.

At 1215, the method may include transmitting the multicast data to the scheduler for transmission via the second wireless network. The operations of 1215 may be performed in accordance with examples as disclosed herein. In some examples, aspects of the operations of 1215 may be performed by a WAN modem manager 925 as described with reference to FIG. 9.

Figure 13:
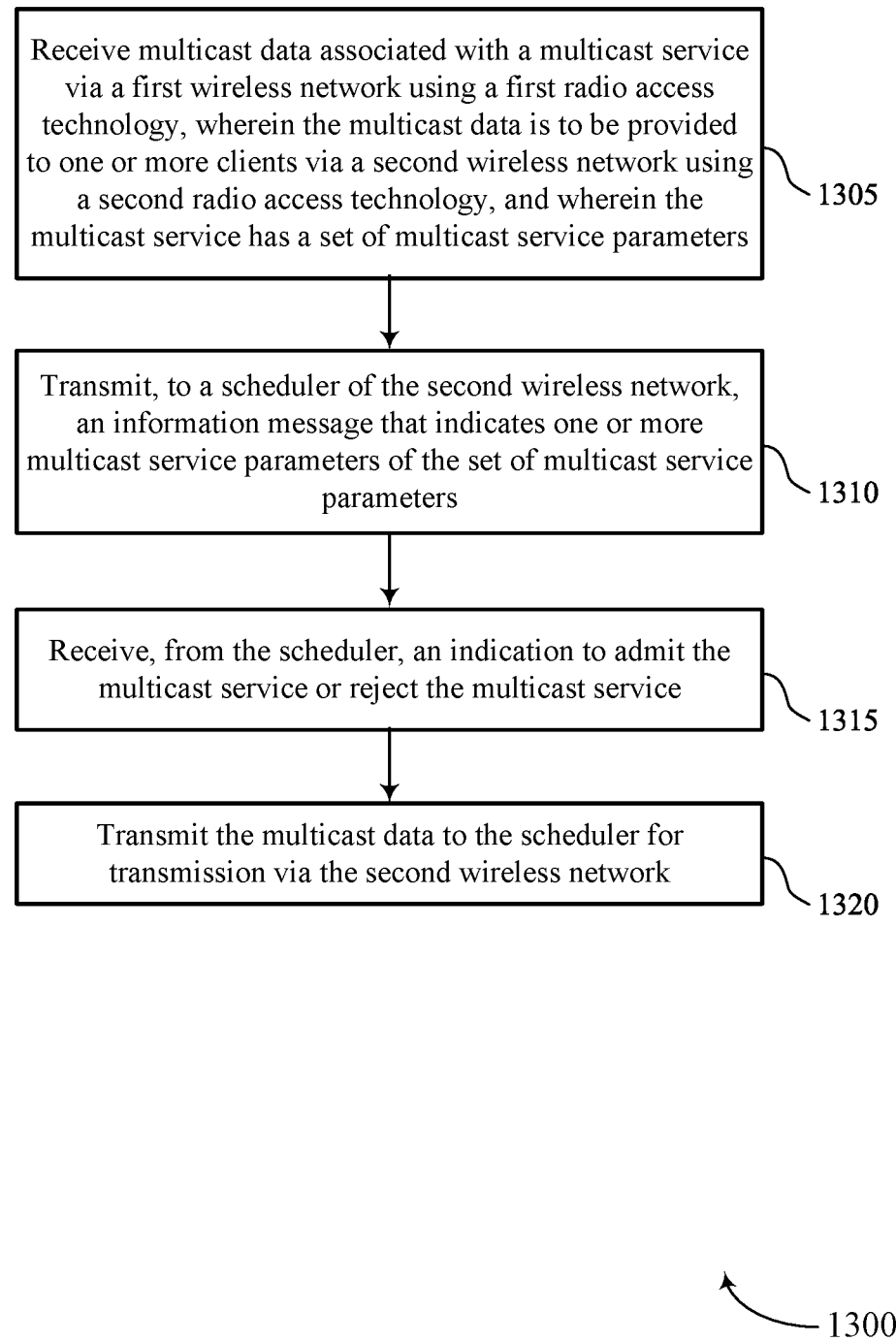

FIG. 13 shows a flowchart illustrating a method 1300 that supports multicast traffic scheduling across multiple RATs in accordance with one or more aspects of the present disclosure. The operations of the method 1300 may be implemented by a network entity or a UE or its components as described herein. For example, the operations of the method 1300 may be performed by a network entity or a UE 115 as described with reference to FIGS. 1 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1305, the method may include receiving multicast data associated with a multicast service via a first wireless network using a first RAT, where the multicast data is to be provided to one or more clients via a second wireless network using a second RAT, and where the multicast service has a set of multicast service parameters. The operations of 1305 may be performed in accordance with examples as disclosed herein. In some examples, aspects of the operations of 1305 may be performed by a WAN modem manager 925 as described with reference to FIG. 9.

At 1310, the method may include transmitting, to a scheduler of the second wireless network, an information message that indicates one or more multicast service parameters of the set of multicast service parameters. The operations of 1310 may be performed in accordance with examples as disclosed herein. In some examples, aspects of the operations of 1310 may be performed by an MBS communications manager 930 as described with reference to FIG. 9.

At 1315, the method may include receiving, from the scheduler, an indication to admit the multicast service or reject the multicast service. The operations of 1315 may be performed in accordance with examples as disclosed herein. In some examples, aspects of the operations of 1315 may be performed by an MBS communications manager 930 as described with reference to FIG. 9.

At 1320, the method may include transmitting the multicast data to the scheduler for transmission via the second wireless network. The operations of 1320 may be performed in accordance with examples as disclosed herein. In some examples, aspects of the operations of 1320 may be performed by a WAN modem manager 925 as described with reference to FIG. 9.

Figure 14:
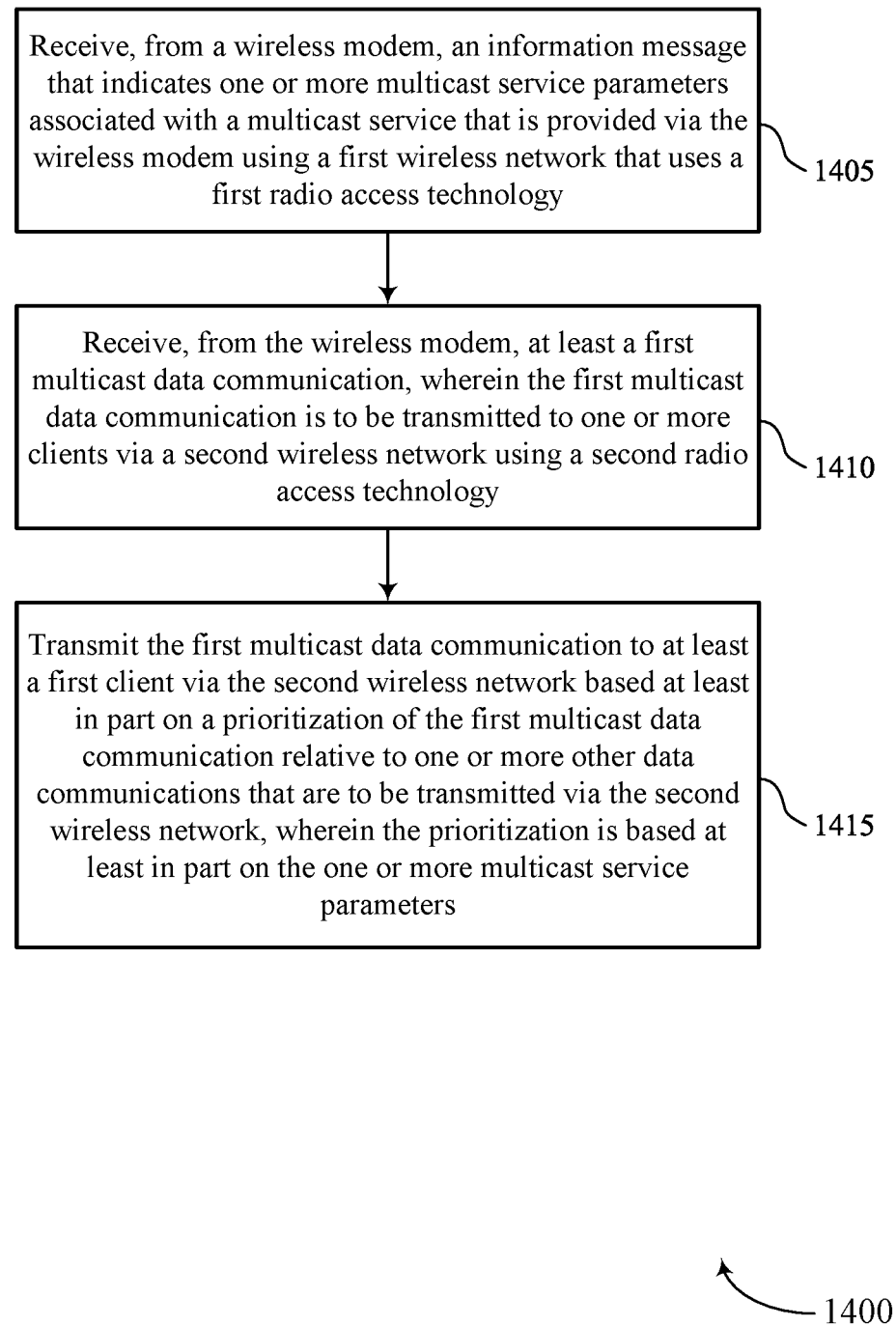

FIG. 14 shows a flowchart illustrating a method 1400 that supports multicast traffic scheduling across multiple RATs in accordance with one or more aspects of the present disclosure. The operations of the method 1400 may be implemented by a network entity or a UE or its components as described herein. For example, the operations of the method 1400 may be performed by a network entity or a UE 115 as described with reference to FIGS. 1 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1405, the method may include receiving, from a wireless modem, an information message that indicates one or more multicast service parameters associated with a multicast service that is provided via the wireless modem using a first wireless network that uses a first RAT. The operations of 1405 may be performed in accordance with examples as disclosed herein. In some examples, aspects of the operations of 1405 may be performed by a WLAN Scheduler 935 as described with reference to FIG. 9.

At 1410, the method may include receiving, from the wireless modem, at least a first multicast data communication, where the first multicast data communication is to be transmitted to one or more clients via a second wireless network using a second RAT. The operations of 1410 may be performed in accordance with examples as disclosed herein. In some examples, aspects of the operations of 1410 may be performed by a WLAN Scheduler 935 as described with reference to FIG. 9.

At 1415, the method may include transmitting the first multicast data communication to at least a first client via the second wireless network based on a prioritization of the first multicast data communication relative to one or more other data communications that are to be transmitted via the second wireless network, where the prioritization is based on the one or more multicast service parameters. The operations of 1415 may be performed in accordance with examples as disclosed herein. In some examples, aspects of the operations of 1415 may be performed by a WLAN modem manager 940 as described with reference to FIG. 9.

Figure 15:
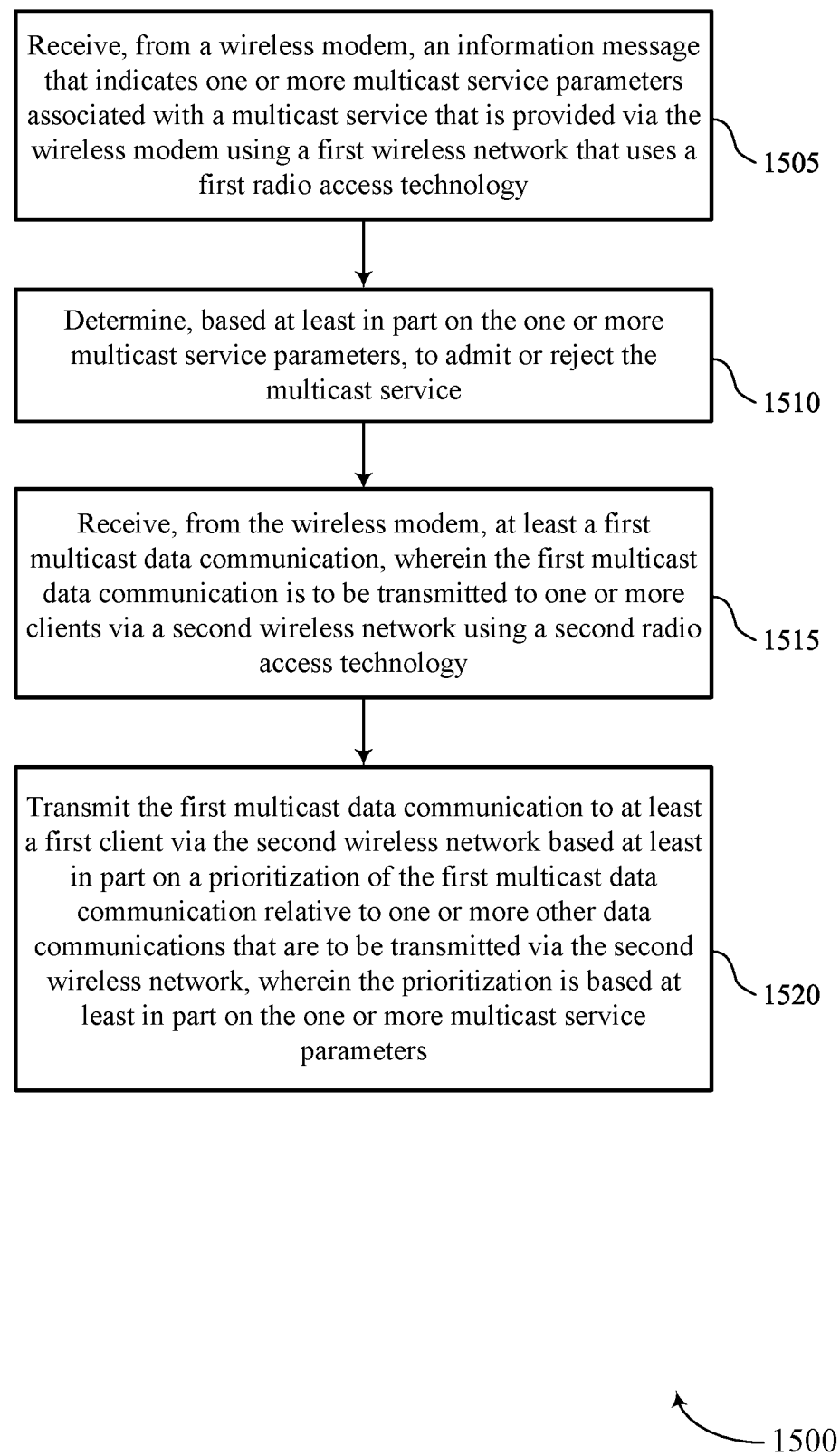

FIG. 15 shows a flowchart illustrating a method 1500 that supports multicast traffic scheduling across multiple RATs in accordance with one or more aspects of the present disclosure. The operations of the method 1500 may be implemented by a network entity or a UE or its components as described herein. For example, the operations of the method 1500 may be performed by a network entity or a UE 115 as described with reference to FIGS. 1 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1505, the method may include receiving, from a wireless modem, an information message that indicates one or more multicast service parameters associated with a multicast service that is provided via the wireless modem using a first wireless network that uses a first RAT. The operations of 1505 may be performed in accordance with examples as disclosed herein. In some examples, aspects of the operations of 1505 may be performed by a WLAN Scheduler 935 as described with reference to FIG. 9.

At 1510, the method may include determining, based on the one or more multicast service parameters, to admit or reject the multicast service. The operations of 1510 may be performed in accordance with examples as disclosed herein. In some examples, aspects of the operations of 1510 may be performed by a WLAN Scheduler 935 as described with reference to FIG. 9. In some cases, the one or more multicast service parameters include one or more of a quantity of clients associated with the multicast service, one or more quality of service parameters associated with the multicast service, a data rate target of the multicast service, a quantity of non-multicast data flows to be communicated concurrently with the multicast service, a capability of each of the clients associated with the multicast service, or a feedback scheme associated with the multicast service.

At 1515, the method may include receiving, from the wireless modem, at least a first multicast data communication, where the first multicast data communication is to be transmitted to one or more clients via a second wireless network using a second RAT. The operations of 1515 may be performed in accordance with examples as disclosed herein. In some examples, aspects of the operations of 1515 may be performed by a WLAN Scheduler 935 as described with reference to FIG. 9.

At 1520, the method may include transmitting the first multicast data communication to at least a first client via the second wireless network based on a prioritization of the first multicast data communication relative to one or more other data communications that are to be transmitted via the second wireless network, where the prioritization is based on the one or more multicast service parameters. The operations of 1520 may be performed in accordance with examples as disclosed herein. In some examples, aspects of the operations of 1520 may be performed by a WLAN modem manager 940 as described with reference to FIG. 9.

Figure 16:
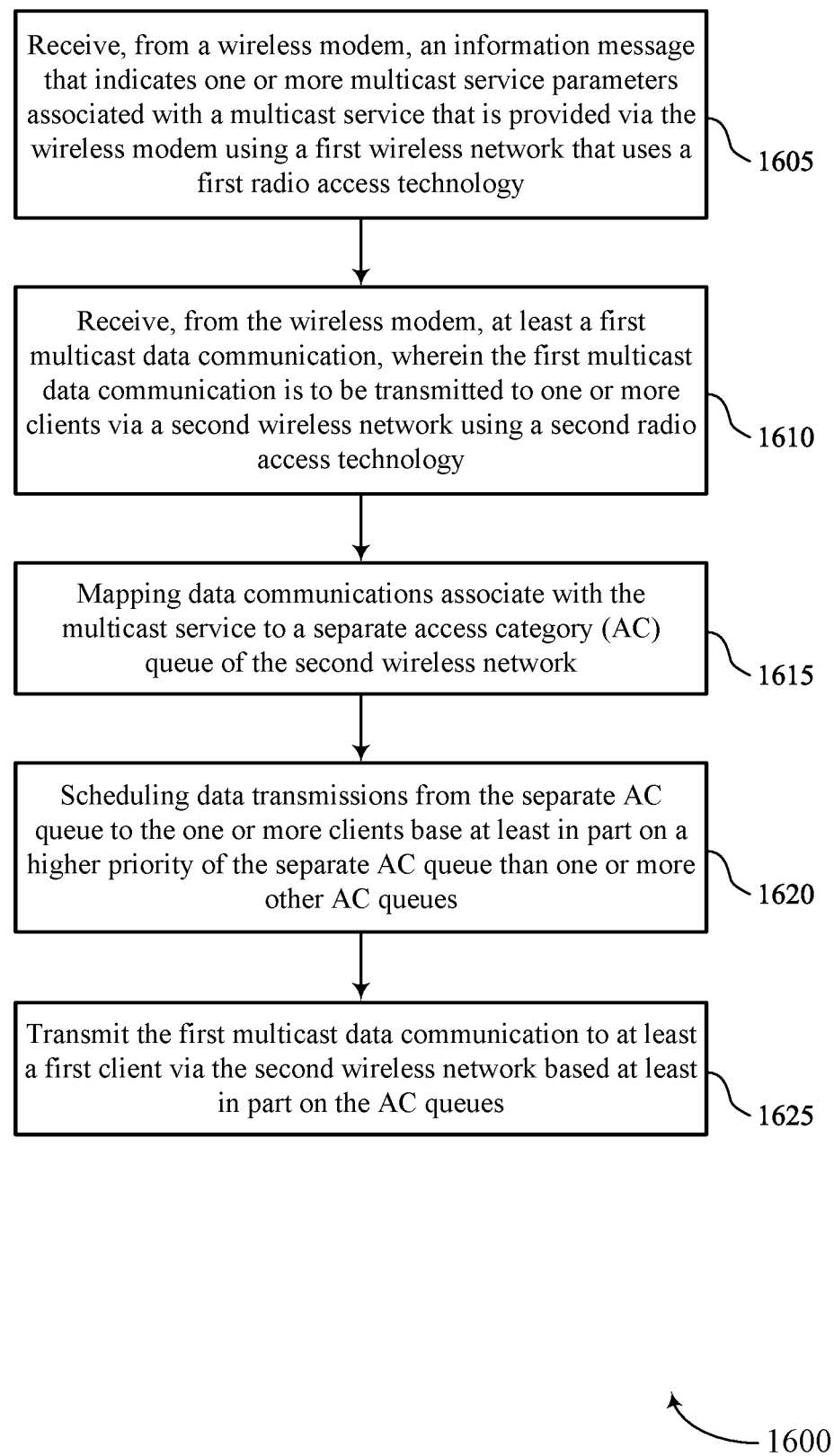

FIG. 16 shows a flowchart illustrating a method 1600 that supports multicast traffic scheduling across multiple RATs in accordance with one or more aspects of the present disclosure. The operations of the method 1600 may be implemented by a network entity or a UE or its components as described herein. For example, the operations of the method 1600 may be performed by a network entity or a UE 115 as described with reference to FIGS. 1 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1605, the method may include receiving, from a wireless modem, an information message that indicates one or more multicast service parameters associated with a multicast service that is provided via the wireless modem using a first wireless network that uses a first RAT. The operations of 1605 may be performed in accordance with examples as disclosed herein. In some examples, aspects of the operations of 1605 may be performed by a WLAN Scheduler 935 as described with reference to FIG. 9.

At 1610, the method may include receiving, from the wireless modem, at least a first multicast data communication, where the first multicast data communication is to be transmitted to one or more clients via a second wireless network using a second RAT. The operations of 1610 may be performed in accordance with examples as disclosed herein. In some examples, aspects of the operations of 1610 may be performed by a WLAN Scheduler 935 as described with reference to FIG. 9.

At 1615, the method may include mapping data communications associated with the multicast service to a separate AC transmit queue of the second wireless network. The operations of 1615 may be performed in accordance with examples as disclosed herein. In some examples, aspects of the operations of 1615 may be performed by an AC queue manager 945 as described with reference to FIG. 9.

At 1620, the method may include scheduling data transmissions from the separate AC transmit queue to the one or more clients based on a higher priority of the separate AC transmit queue than one or more other AC queues. The operations of 1620 may be performed in accordance with examples as disclosed herein. In some examples, aspects of the operations of 1620 may be performed by an AC queue manager 945 as described with reference to FIG. 9.

At 1625, the method may include transmitting the first multicast data communication to at least a first client via the second wireless network based on the AC queues. The operations of 1625 may be performed in accordance with examples as disclosed herein. In some examples, aspects of the operations of 1625 may be performed by a WLAN modem manager 940 as described with reference to FIG. 9.

Figure 17:
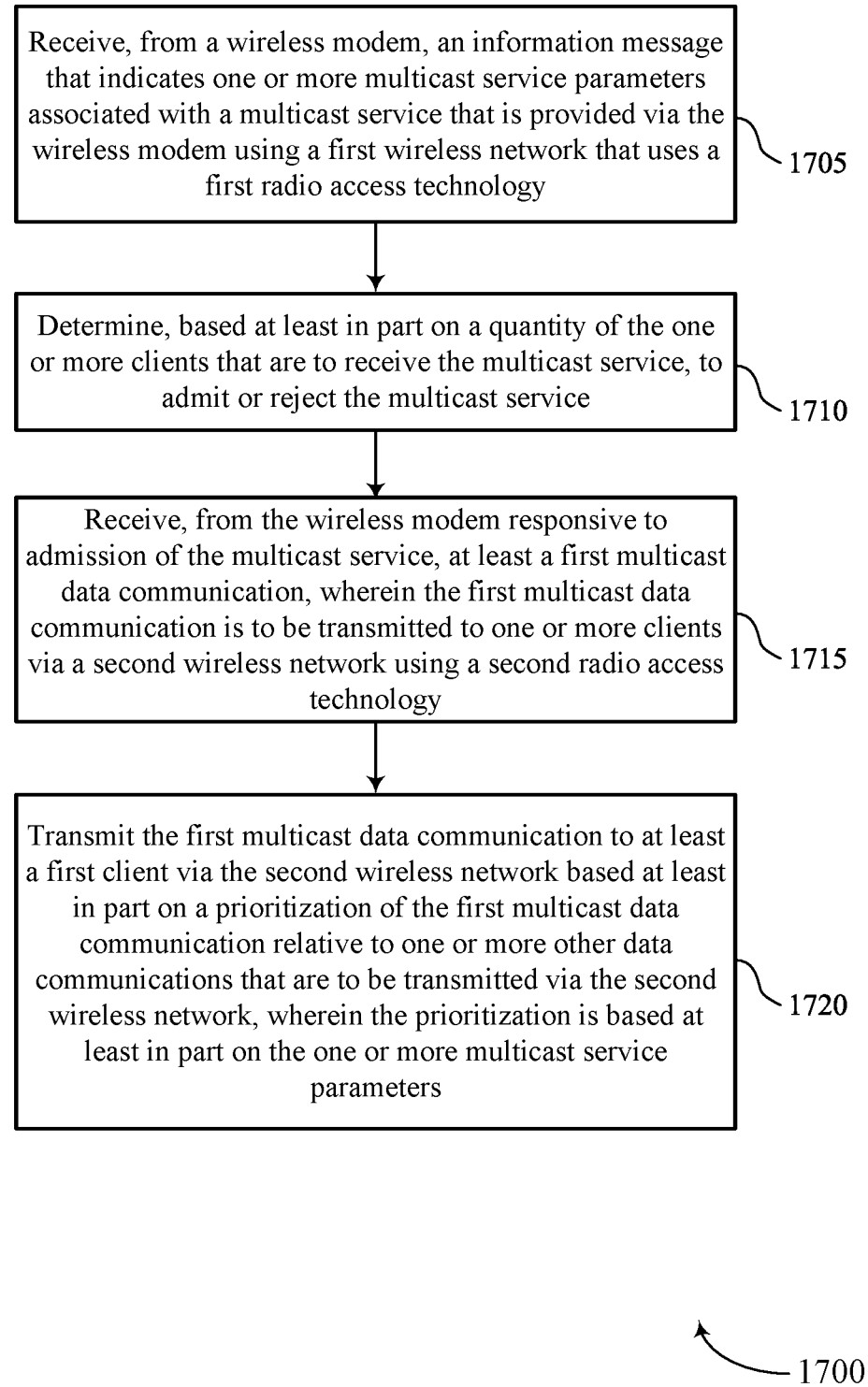

FIG. 17 shows a flowchart illustrating a method 1700 that supports multicast traffic scheduling across multiple RATs in accordance with one or more aspects of the present disclosure. The operations of the method 1700 may be implemented by a network entity or a UE or its components as described herein. For example, the operations of the method 1700 may be performed by a network entity or a UE 115 as described with reference to FIGS. 1 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1705, the method may include receiving, from a wireless modem, an information message that indicates one or more multicast service parameters associated with a multicast service that is provided via the wireless modem using a first wireless network that uses a first RAT. The operations of 1705 may be performed in accordance with examples as disclosed herein. In some examples, aspects of the operations of 1705 may be performed by a WLAN Scheduler 935 as described with reference to FIG. 9.

At 1710, the method may include determining, based on a quantity of the one or more clients that are to receive the multicast service, to admit or reject the multicast service. The operations of 1710 may be performed in accordance with examples as disclosed herein. In some examples, aspects of the operations of 1710 may be performed by a WLAN Scheduler 935 as described with reference to FIG. 9.

At 1715, the method may include receiving, from the wireless modem responsive to admission of the multicast service, at least a first multicast data communication, where the first multicast data communication is to be transmitted to one or more clients via a second wireless network using a second RAT. The operations of 1715 may be performed in accordance with examples as disclosed herein. In some examples, aspects of the operations of 1715 may be performed by a WLAN Scheduler 935 as described with reference to FIG. 9.

At 1720, the method may include transmitting the first multicast data communication to at least a first client via the second wireless network based on a prioritization of the first multicast data communication relative to one or more other data communications that are to be transmitted via the second wireless network, where the prioritization is based on the one or more multicast service parameters. The operations of 1720 may be performed in accordance with examples as disclosed herein. In some examples, aspects of the operations of 1720 may be performed by a WLAN modem manager 940 as described with reference to FIG. 9.

Figure 18:
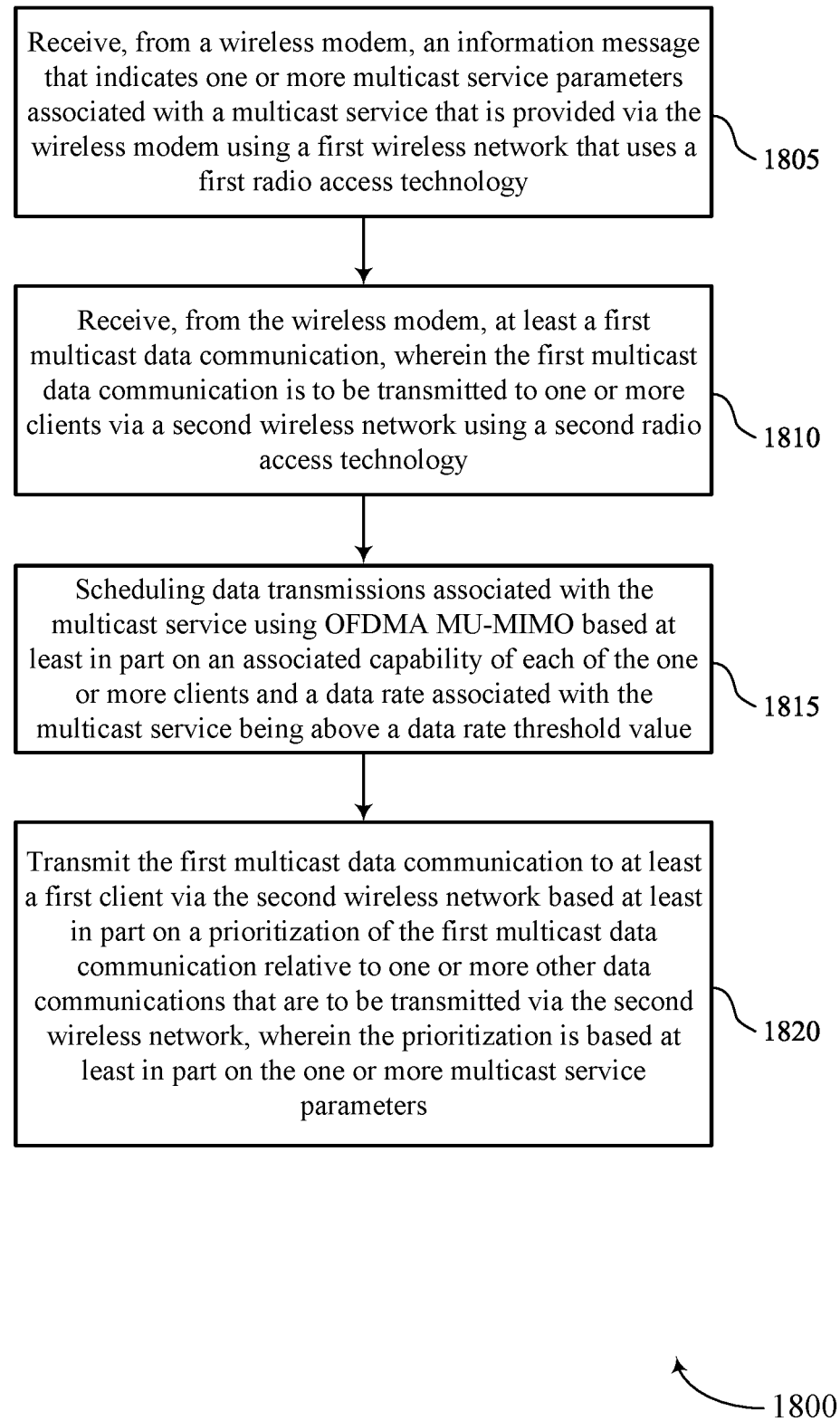

FIG. 18 shows a flowchart illustrating a method 1800 that supports multicast traffic scheduling across multiple RATs in accordance with one or more aspects of the present disclosure. The operations of the method 1800 may be implemented by a network entity or a UE or its components as described herein. For example, the operations of the method 1800 may be performed by a network entity or a UE 115 as described with reference to FIGS. 1 through 11. In some examples, a network entity or a UE may execute a set of instructions to control the functional elements of the network entity or the UE to perform the described functions. Additionally, or alternatively, the network entity or the UE may perform aspects of the described functions using special-purpose hardware.

At 1805, the method may include receiving, from a wireless modem, an information message that indicates one or more multicast service parameters associated with a multicast service that is provided via the wireless modem using a first wireless network that uses a first RAT. The operations of 1805 may be performed in accordance with examples as disclosed herein. In some examples, aspects of the operations of 1805 may be performed by a WLAN Scheduler 935 as described with reference to FIG. 9.

At 1810, the method may include receiving, from the wireless modem, at least a first multicast data communication, where the first multicast data communication is to be transmitted to one or more clients via a second wireless network using a second RAT. The operations of 1810 may be performed in accordance with examples as disclosed herein. In some examples, aspects of the operations of 1810 may be performed by a WLAN Scheduler 935 as described with reference to FIG. 9.

At 1815, the method may include scheduling data transmissions associated with the multicast service using OFDMA or MU-MIMO based on an associated capability of each of the one or more clients and a data rate associated with the multicast service being above a data rate threshold value. The operations of 1815 may be performed in accordance with examples as disclosed herein. In some examples, aspects of the operations of 1815 may be performed by a CPE datapath manager 950 as described with reference to FIG. 9.

At 1820, the method may include transmitting the first multicast data communication to at least a first client via the second wireless network based on a prioritization of the first multicast data communication relative to one or more other data communications that are to be transmitted via the second wireless network, where the prioritization is based on the one or more multicast service parameters. The operations of 1820 may be performed in accordance with examples as disclosed herein. In some examples, aspects of the operations of 1820 may be performed by a WLAN modem manager 940 as described with reference to FIG. 9.

The following provides an overview of aspects of the present disclosure:

Aspect 1: A method for wireless communication, comprising: receiving multicast data associated with a multicast service via a first wireless network using a first radio access technology, wherein the multicast data is to be provided to one or more clients via a second wireless network using a second radio access technology, and wherein the multicast service has a set of multicast service parameters; transmitting, to a scheduler of the second wireless network, an information message that indicates one or more multicast service parameters of the set of multicast service parameters; and transmitting the multicast data to the scheduler for transmission via the second wireless network.

Aspect 2: The method of aspect 1, further comprising: receiving, from the scheduler, an indication to admit the multicast service or reject the multicast service, and wherein the transmitting the multicast data is performed responsive to the indication to admit the multicast service.

Aspect 3: The method of any of aspects 1 through 2, wherein the set of multicast service parameters include one or more of a quantity of clients associated with the multicast service, one or more quality of service parameters, a data rate target of the multicast data, a quantity of non-multicast data flows to be communicated concurrently with the multicast service, or a feedback scheme associated with the multicast service.

Aspect 4: The method of aspect 3, wherein the quantity of clients indicates a quantity of endpoint devices that are to be supported using the multicast service.

Aspect 5: The method of any of aspects 3 through 4, wherein the one or more quality of service parameters indicate an amount of delay tolerance of the multicast data.

Aspect 6: The method of any of aspects 3 through 5, wherein the feedback scheme associated with the multicast service indicates a no-feedback scheme, a negative-acknowledgment-only feedback scheme, or an acknowledgment/negative-acknowledgment feedback scheme.

Aspect 7: The method of any of aspects 1 through 6, wherein the first wireless network is a 5G or 6G radio access network and the second wireless network is a WLAN.

Aspect 8: A method for wireless communication, comprising: receiving, from a wireless modem, an information message that indicates one or more multicast service parameters associated with a multicast service that is provided via the wireless modem using a first wireless network that uses a first radio access technology; receiving, from the wireless modem, at least a first multicast data communication, wherein the first multicast data communication is to be transmitted to one or more clients via a second wireless network using a second radio access technology; and transmitting the first multicast data communication to at least a first client via the second wireless network based at least in part on a prioritization of the first multicast data communication relative to one or more other data communications that are to be transmitted via the second wireless network, wherein the prioritization is based at least in part on the one or more multicast service parameters.

Aspect 9: The method of aspect 8, further comprising: determining, based at least in part on the one or more multicast service parameters, to admit or reject the multicast service.

Aspect 10: The method of any of aspects 8 through 9, wherein the one or more multicast service parameters include one or more of a quantity of clients associated with the multicast service, one or more quality of service parameters associated with the multicast service, a data rate target of the multicast service, a quantity of non-multicast data flows to be communicated concurrently with the multicast service, a capability of each of the clients associated with the multicast service, or a feedback scheme associated with the multicast service.

Aspect 11: The method of aspect 10, further comprising: determining, based at least in part on the capability of each of the clients associated with the multicast service, to admit or reject the multicast service.

Aspect 12: The method of aspect 11, wherein the capability of each of the clients includes an OFDMA capability or a MU-MIMO capability.

Aspect 13: The method of any of aspects 8 through 12, further comprising: mapping data communications associated with the multicast service to a separate AC queue of the second wireless network; and scheduling data transmissions from the separate AC queue to the one or more clients based at least in part on a higher priority of the separate AC queue than one or more other AC queues.

Aspect 14: The method of aspect 13, wherein the mapping the data communications associated with the multicast service to the separate AC queue is based at least in part on one or more QoS threshold values associated with the separate AC queue and the one or more other AC queues, and a QoS associated with the multicast service that indicates an amount of delay tolerance of the multicast service.

Aspect 15: The method of any of aspects 13 through 14, wherein the mapping the data communications associated with the multicast service to the separate AC queue is based at least in part on a feedback scheme of the multicast service, and wherein a no-feedback scheme or a negative-acknowledgment feedback scheme is mapped to a lower priority AC queue and an acknowledgment/negative-acknowledgment feedback scheme is mapped to the separate AC queue that has higher priority than the one or more other AC queues.

Aspect 16: The method of any of aspects 8 through 15, further comprising: determining, based at least in part on a quantity of the one or more clients that are to receive the multicast service, to admit or reject the multicast service.

Aspect 17: The method of any of aspects 8 through 16, further comprising: scheduling data transmissions associated with the multicast service using OFDMA or MU-MIMO based at least in part on an associated capability of each of the one or more clients and a data rate associated with the multicast service being above a data rate threshold value.

Aspect 18: The method of any of aspects 8 through 17, wherein one or more threshold values associated with the one or more multicast service parameters are adjusted based at least in part on a quantity of other multicast service flows and other non-multicast service flows.

Aspect 19: The method of any of aspects 8 through 18, wherein the first wireless network is a 5G or 6G radio access network and the second wireless network is a WLAN.

Aspect 20: An apparatus for wireless communication, comprising a processor; memory coupled with the processor; and instructions stored in the memory and executable by the processor to cause the apparatus to perform a method of any of aspects 1 through 7.

Aspect 21: An apparatus for wireless communication, comprising at least one means for performing a method of any of aspects 1 through 7.

Aspect 22: A non-transitory computer-readable medium storing code for wireless communication, the code comprising instructions executable by a processor to perform a method of any of aspects 1 through 7.

Aspect 23: An apparatus for wireless communication, comprising a processor; memory coupled with the processor; and instructions stored in the memory and executable by the processor to cause the apparatus to perform a method of any of aspects 8 through 19.

Aspect 24: An apparatus for wireless communication, comprising at least one means for performing a method of any of aspects 8 through 19.

Aspect 25: A non-transitory computer-readable medium storing code for wireless communication, the code comprising instructions executable by a processor to perform a method of any of aspects 8 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
receiving multicast data associated with a multicast service via a first wireless network using a first radio access technology, wherein the multicast data is to be provided to one or more clients via a second wireless network using a second radio access technology, and wherein the multicast service has a set of multicast service parameters comprising a quantity of clients associated with the multicast service, one or more quality of service parameters, a data rate target of the multicast data, a quantity of non-multicast data flows to be communicated concurrently with the multicast service, and a feedback scheme associated with the multicast service;
transmitting, to a scheduler of the second wireless network, an information message that indicates one or more multicast service parameters of the set of multicast service parameters; and
transmitting the multicast data to the scheduler for transmission via the second wireless network.

2. The method of claim 1, further comprising:
receiving, from the scheduler, an indication to admit the multicast service or reject the multicast service, and wherein the transmitting the multicast data is performed responsive to the indication to admit the multicast service.

3. The method of claim 1, wherein the quantity of clients indicates a quantity of endpoint devices that are to be supported using the multicast service.

4. The method of claim 1, wherein the one or more quality of service parameters indicate an amount of delay tolerance of the multicast data.

5. The method of claim 1, wherein the feedback scheme associated with the multicast service indicates a no-feedback scheme, a negative-acknowledgment-only feedback scheme, or an acknowledgment/negative-acknowledgment feedback scheme.

6. The method of claim 1, wherein the first wireless network is a fifth generation (5G) or sixth generation (6G) radio access network and the second wireless network is a wireless local area network (WLAN).

7. A method for wireless communication, comprising:
receiving, from a wireless modem, an information message that indicates one or more multicast service parameters associated with a multicast service that is provided via the wireless modem using a first wireless network that uses a first radio access technology;
receiving, from the wireless modem, at least a first multicast data communication, wherein the first multicast data communication is to be transmitted to one or more clients via a second wireless network using a second radio access technology;
transmitting the first multicast data communication to at least a first client via the second wireless network based at least in part on a prioritization of the first multicast data communication relative to one or more other data communications that are to be transmitted via the second wireless network, wherein the prioritization is based at least in part on the one or more multicast service parameters;
mapping data communications associated with the multicast service to a separate access category (AC) transmit queue of the second wireless network; and
scheduling data transmissions from the separate AC transmit queue to the one or more clients based at least in part on a higher priority of the separate AC transmit queue than one or more other AC queues.

8. The method of claim 7, further comprising:
determining, based at least in part on the one or more multicast service parameters, to admit or reject the multicast service.

9. The method of claim 7, wherein the one or more multicast service parameters include one or more of a quantity of clients associated with the multicast service, one or more quality of service parameters associated with the multicast service, a data rate target of the multicast service, a quantity of non-multicast data flows to be communicated concurrently with the multicast service, a capability of each of the clients associated with the multicast service, or a feedback scheme associated with the multicast service.

10. The method of claim 9, further comprising:
determining, based at least in part on the capability of each of the clients associated with the multicast service, to admit or reject the multicast service.

11. The method of claim 10, wherein the capability of each of the clients includes an orthogonal frequency division multiple access (OFDMA) capability or a multi-user multiple-input-multiple-output (MU-MIMO) capability.

12. The method of claim 7, wherein the mapping the data communications associated with the multicast service to the separate AC transmit queue is based at least in part on one or more quality of service (QOS) threshold values associated with the separate AC transmit queue and the one or more other AC queues, and a QoS associated with the multicast service that indicates an amount of delay tolerance of the multicast service.

13. The method of claim 7, wherein the mapping the data communications associated with the multicast service to the separate AC transmit queue is based at least in part on a feedback scheme of the multicast service, and wherein a no-feedback scheme or a negative-acknowledgment feedback scheme is mapped to a lower priority AC queue and an acknowledgment/negative-acknowledgment feedback scheme is mapped to the separate AC transmit queue that has higher priority than the one or more other AC queues.

14. The method of claim 7, further comprising:
determining, based at least in part on a quantity of the one or more clients that are to receive the multicast service, to admit or reject the multicast service.

15. The method of claim 7, further comprising:
scheduling data transmissions associated with the multicast service using orthogonal frequency division multiple access (OFDMA) or multi-user multiple-input-multiple-output (MU-MIMO) based at least in part on an associated capability of each of the one or more clients and a data rate associated with the multicast service being above a data rate threshold value.

16. The method of claim 7, wherein one or more threshold values associated with the one or more multicast service parameters are adjusted based at least in part on a quantity of other multicast service flows and other non-multicast service flows.

17. The method of claim 7, wherein the first wireless network is a fifth generation (5G) or sixth generation (6G)

radio access network and the second wireless network is a wireless local area network (WLAN).

18. An apparatus for wireless communication, comprising:
one or more memories storing processor executable code; and
one or more processors coupled with the one or more memories and individually or collectively operable to execute the code to cause the apparatus to:
receive multicast data associated with a multicast service via a first wireless network using a first radio access technology, wherein the multicast data is to be provided to one or more clients via a second wireless network using a second radio access technology, and wherein the multicast service has a set of multicast service parameters comprising a quantity of clients associated with the multicast service, one or more quality of service parameters, a data rate target of the multicast data, a quantity of non-multicast data flows to be communicated concurrently with the multicast service, and a feedback scheme associated with the multicast service;
transmit, to a scheduler of the second wireless network, an information message that indicates one or more multicast service parameters of the set of multicast service parameters; and
transmit the multicast data to the scheduler for transmission via the second wireless network.

19. The apparatus of claim 18, wherein the one or more processors are individually or collectively further operable to execute the code to cause the apparatus to:
receive, from the scheduler, an indication to admit the multicast service or reject the multicast service, and wherein the transmitting the multicast data is performed responsive to the indication to admit the multicast service.

20. The apparatus of claim 18, wherein the first wireless network is a fifth generation (5G) or sixth generation (6G) radio access network and the second wireless network is a wireless local area network (WLAN).

21. An apparatus for wireless communication, comprising:
one or more memories storing processor executable code; and
one or more processors coupled with the one or more memories and individually or collectively operable to execute the code to cause the apparatus to:
receive, from a wireless modem, an information message that indicates one or more multicast service parameters associated with a multicast service that is provided via the wireless modem using a first wireless network that uses a first radio access technology;
receive, from the wireless modem, at least a first multicast data communication, wherein the first multicast data communication is to be transmitted to one or more clients via a second wireless network using a second radio access technology; and
transmit the first multicast data communication to at least a first client via the second wireless network based at least in part on a prioritization of the first multicast data communication relative to one or more other data communications that are to be transmitted via the second wireless network, wherein the prioritization is based at least in part on the one or more multicast service parameters;
map data communications associated with the multicast service to a separate access category (AC) transmit queue of the second wireless network; and
schedule data transmissions from the separate AC transmit queue to the one or more clients based at least in part on a higher priority of the separate AC transmit queue than one or more other AC queues.

22. The apparatus of claim 21, wherein the one or more processors are individually or collectively further operable to execute the code to cause the apparatus to:
determine, based at least in part on the one or more multicast service parameters, to admit or reject the multicast service.

23. The apparatus of claim 21, wherein the one or more multicast service parameters include one or more of a quantity of clients associated with the multicast service, one or more quality of service parameters associated with the multicast service, a data rate target of the multicast service, a quantity of non-multicast data flows to be communicated concurrently with the multicast service, a capability of each of the clients associated with the multicast service, or a feedback scheme associated with the multicast service.

24. The apparatus of claim 23, wherein the one or more processors are individually or collectively further operable to execute the code to cause the apparatus to:
determine, based at least in part on the capability of each of the clients associated with the multicast service, to admit or reject the multicast service.

25. The apparatus of claim 21, wherein the mapping the data communications associated with the multicast service to the separate AC transmit queue is based at least in part on one or more quality of service (QOS) threshold values associated with the separate AC transmit queue and the one or more other AC queues, and a QoS associated with the multicast service that indicates an amount of delay tolerance of the multicast service.

26. The apparatus of claim 21, wherein the mapping the data communications associated with the multicast service to the separate AC transmit queue is based at least in part on a feedback scheme of the multicast service, and wherein a no-feedback scheme or a negative-acknowledgment feedback scheme is mapped to a lower priority AC queue and an acknowledgment/negative-acknowledgment feedback scheme is mapped to the separate AC transmit queue that has higher priority than the one or more other AC queues.

* * * * *